US010192405B2

(12) United States Patent
Moody et al.

(10) Patent No.: US 10,192,405 B2
(45) Date of Patent: Jan. 29, 2019

(54) GAMING SYSTEM AND METHOD PROVIDING A MULTI-PLAY GAME HAVING RANDOMLY-INCREASABLE AND RANDOMLY-DISTRIBUTABLE PERSISTENT MODIFIERS

(71) Applicant: IGT, Las Vegas, NV (US)

(72) Inventors: Ernest W. Moody, Las Vegas, NV (US); Yoohwan Hwang, Las Vegas, NV (US)

(73) Assignee: IGT, Las Vegas, NV (US)

( * ) Notice: Subject to any disclaimer, the term of this patent is extended or adjusted under 35 U.S.C. 154(b) by 0 days.

(21) Appl. No.: 15/483,276

(22) Filed: Apr. 10, 2017

(65) Prior Publication Data

US 2017/0309125 A1 Oct. 26, 2017

Related U.S. Application Data

(60) Provisional application No. 62/326,420, filed on Apr. 22, 2016.

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2018.01) |
| ***G07F 17/32*** | (2006.01) |

(52) U.S. Cl.

CPC ...... *G07F 17/3267* (2013.01); *G07F 17/3211* (2013.01); *G07F 17/3227* (2013.01); *G07F 17/3244* (2013.01); *G07F 17/3293* (2013.01)

(58) Field of Classification Search

CPC ............. G07F 17/3267; G07F 17/3211; G07F 17/3227; G07F 17/3244; G07F 17/3293

See application file for complete search history.

(56) References Cited

U.S. PATENT DOCUMENTS

| | | | |
|---|---|---|---|
| 5,100,137 | A | 3/1992 | Fulton |
| 5,167,413 | A | 12/1992 | Fulton |
| 5,251,897 | A | 10/1993 | Fulton |
| 5,322,295 | A | 6/1994 | Cabot et al. |

(Continued)

*Primary Examiner* — Kevin Y Kim

(74) *Attorney, Agent, or Firm* — Neal, Gerber & Eisenberg LLP

(57) ABSTRACT

In various embodiments, the persistent modifiers are persistent multipliers. Generally, in certain such embodiments, the multi-play game has a plurality of separate outcome-generating elements and is associated with a plurality of separate multiplier banks. Each multiplier bank is associated with a persistent multiplier maintained from game play to game play until distributed. When a random multiplier increase event occurs, the gaming system increases the persistent multiplier of at least one of the multiplier banks. When a random multiplier distribution event occurs for one of the multiplier banks, the gaming system distributes the persistent multiplier of that multiplier bank among the plurality of outcome-generating elements. The gaming system does so by determining a plurality of individual multipliers based on that persistent multiplier and assigning each individual multiplier to one of the outcome-generating elements. The gaming system uses the individual multipliers to modify any awards associated with their respective assigned outcome-generating elements.

17 Claims, 13 Drawing Sheets

(56) References Cited

U.S. PATENT DOCUMENTS

| | | | | |
|---|---|---|---|---|
| 5,374,067 | A | 12/1994 | Jones | |
| 5,411,257 | A | 5/1995 | Fulton | |
| 5,431,408 | A | 7/1995 | Adams | |
| 5,437,451 | A | 8/1995 | Fulton | |
| 5,456,465 | A * | 10/1995 | Durham | G07F 17/3244 273/143 R |
| 5,531,448 | A | 7/1996 | Moody | |
| 5,636,842 | A | 6/1997 | Cabot et al. | |
| 5,732,950 | A | 3/1998 | Moody | |
| 5,755,621 | A | 5/1998 | Marks et al. | |
| 5,803,809 | A | 9/1998 | Yoseloff | |
| 5,820,460 | A | 10/1998 | Fulton | |
| 5,823,873 | A | 10/1998 | Moody | |
| 5,833,536 | A | 11/1998 | Davids et al. | |
| 5,833,537 | A | 11/1998 | Barrie | |
| 5,882,259 | A | 3/1999 | Holmes, Jr. et al. | |
| 5,911,418 | A | 6/1999 | Adams | |
| 5,954,335 | A | 9/1999 | Moody | |
| 5,957,774 | A | 9/1999 | Holmes, Jr. et al. | |
| 6,007,066 | A | 12/1999 | Moody | |
| 6,050,658 | A | 4/2000 | O'Sullivan et al. | |
| 6,062,979 | A | 5/2000 | Inoue | |
| 6,098,985 | A | 8/2000 | Moody | |
| 6,176,781 | B1 | 1/2001 | Walker et al. | |
| 6,179,711 | B1 | 1/2001 | Yoseloff | |
| 6,193,235 | B1 | 2/2001 | Vancura et al. | |
| 6,196,547 | B1 | 3/2001 | Pascal et al. | |
| 6,213,877 | B1 | 4/2001 | Walker et al. | |
| 6,234,897 | B1 * | 5/2001 | Frohm | G07F 17/32 273/143 R |
| 6,248,016 | B1 | 6/2001 | Walker et al. | |
| 6,257,979 | B1 | 7/2001 | Walker et al. | |
| 6,311,978 | B1 | 11/2001 | Moody | |
| 6,328,649 | B1 | 12/2001 | Randall et al. | |
| 6,334,613 | B1 | 1/2002 | Yoseloff | |
| 6,406,023 | B1 | 6/2002 | Rowe | |
| 6,419,578 | B1 | 7/2002 | Moody et al. | |
| 6,422,940 | B1 | 7/2002 | Walker et al. | |
| 6,454,651 | B1 | 9/2002 | Yoseloff | |
| 6,471,208 | B2 | 10/2002 | Yoseloff et al. | |
| 6,474,645 | B2 | 11/2002 | Tarantino | |
| 6,517,074 | B1 | 2/2003 | Moody et al. | |
| 6,523,829 | B1 | 2/2003 | Walker et al. | |
| 6,561,898 | B2 | 5/2003 | Moody | |
| 6,568,680 | B1 | 5/2003 | Moody et al. | |
| 6,569,015 | B1 | 5/2003 | Baerlocher et al. | |
| 6,652,377 | B1 | 11/2003 | Moody | |
| 6,672,959 | B2 | 1/2004 | Moody et al. | |
| 6,726,427 | B2 | 4/2004 | Jarvis et al. | |
| 6,726,563 | B1 | 4/2004 | Baerlocher et al. | |
| 6,729,961 | B1 | 5/2004 | Millerschone | |
| 6,916,245 | B1 | 7/2005 | Vancura et al. | |
| 6,935,950 | B2 | 8/2005 | Tarantino | |
| 6,955,356 | B2 | 10/2005 | Moody | |
| 6,964,418 | B2 | 11/2005 | Moody | |
| 6,991,538 | B2 | 1/2006 | Cannon | |
| 6,994,624 | B2 | 2/2006 | Gold et al. | |
| 7,056,207 | B2 | 6/2006 | Walker et al. | |
| 7,059,965 | B2 | 6/2006 | Jackson | |
| 7,137,628 | B2 | 11/2006 | Moody | |
| 7,156,397 | B2 | 1/2007 | Moody et al. | |
| 7,156,734 | B1 | 1/2007 | Walker et al. | |
| 7,201,655 | B2 | 4/2007 | Walker et al. | |
| 7,247,092 | B2 | 7/2007 | Jarvis et al. | |
| 7,258,611 | B2 | 8/2007 | Bigelow, Jr. et al. | |
| 7,297,057 | B2 | 11/2007 | Gerrard et al. | |
| 7,306,518 | B2 | 12/2007 | Hughs-Baird et al. | |
| 7,331,863 | B2 | 2/2008 | Baerlocher | |
| 7,338,370 | B2 | 3/2008 | Oles et al. | |
| 7,354,344 | B2 | 4/2008 | Paulsen et al. | |
| 7,390,258 | B2 | 6/2008 | Millerschone | |
| 7,416,186 | B2 | 8/2008 | Walker et al. | |
| 7,419,162 | B2 | 9/2008 | Lancaster et al. | |
| 7,488,251 | B2 | 2/2009 | Kaminkow | |
| 7,524,243 | B2 | 4/2009 | Bansemer et al. | |
| 7,566,271 | B2 | 7/2009 | Hostetler et al. | |
| 7,614,946 | B2 | 11/2009 | Nicely | |
| 7,641,197 | B2 | 1/2010 | Jackson | |
| 7,658,672 | B1 | 2/2010 | Wolf et al. | |
| 7,674,180 | B2 | 3/2010 | Graham et al. | |
| 7,748,714 | B2 | 7/2010 | Nicely et al. | |
| 7,749,059 | B2 | 7/2010 | Tarantino | |
| 7,771,274 | B2 | 8/2010 | Walker et al. | |
| 7,785,188 | B2 | 8/2010 | Cannon | |
| 7,789,755 | B2 | 9/2010 | Davis et al. | |
| 7,803,041 | B2 | 9/2010 | Gold et al. | |
| 7,803,043 | B2 | 9/2010 | Jackson | |
| 7,815,500 | B2 | 10/2010 | Montross et al. | |
| 7,837,545 | B2 | 11/2010 | Blair, Jr. et al. | |
| 7,857,693 | B1 | 12/2010 | Johnson et al. | |
| 7,862,417 | B2 | 1/2011 | Nicely | |
| 7,862,430 | B2 | 1/2011 | Baerlocher et al. | |
| 7,867,073 | B2 | 1/2011 | Walker et al. | |
| 7,914,369 | B2 | 3/2011 | Walker et al. | |
| 7,918,724 | B2 | 4/2011 | Walker et al. | |
| 7,922,571 | B2 | 4/2011 | Walker et al. | |
| 7,985,133 | B2 | 7/2011 | Baerlocher et al. | |
| 7,993,191 | B2 | 8/2011 | Evans et al. | |
| 8,002,620 | B2 | 8/2011 | Nicely et al. | |
| 8,062,119 | B2 | 11/2011 | Stem et al. | |
| 8,083,578 | B2 | 12/2011 | Jackson | |
| 8,092,290 | B2 | 1/2012 | Darby | |
| 8,092,302 | B2 | 1/2012 | Cuddy et al. | |
| 8,118,662 | B2 | 2/2012 | Caputo et al. | |
| 8,123,604 | B2 | 2/2012 | Lancaster et al. | |
| 8,137,174 | B2 | 3/2012 | Nicely et al. | |
| 8,152,616 | B2 | 4/2012 | Moody | |
| 8,152,630 | B2 | 4/2012 | Cohen | |
| 8,177,616 | B2 | 5/2012 | Nicely | |
| 8,177,620 | B2 | 5/2012 | Miles et al. | |
| 8,197,319 | B2 | 6/2012 | Nicely | |
| 8,216,039 | B2 | 7/2012 | Nicely et al. | |
| 8,226,469 | B2 | 7/2012 | Pawloski et al. | |
| 8,231,454 | B2 | 7/2012 | Caputo | |
| 8,235,780 | B2 | 8/2012 | Nicely | |
| 8,262,448 | B2 | 9/2012 | Nicely et al. | |
| 8,262,455 | B2 | 9/2012 | Caputo et al. | |
| 8,277,305 | B2 | 10/2012 | Caputo et al. | |
| 8,328,614 | B2 | 12/2012 | Jones et al. | |
| 8,353,751 | B2 | 1/2013 | Bickley et al. | |
| 8,376,836 | B2 | 2/2013 | Baerlocher et al. | |
| 8,382,572 | B2 | 2/2013 | Hoffman et al. | |
| 8,398,473 | B2 | 3/2013 | Baerlocher et al. | |
| 8,408,984 | B2 | 4/2013 | Walker et al. | |
| 8,425,303 | B2 | 4/2013 | Kennedy et al. | |
| 8,434,764 | B2 | 5/2013 | Walker et al. | |
| 8,444,465 | B2 | 5/2013 | Macaulay | |
| 8,449,362 | B2 | 5/2013 | Jackson | |
| 8,449,363 | B2 | 5/2013 | Baerlocher et al. | |
| 8,449,378 | B2 | 5/2013 | Michaelson et al. | |
| 8,475,253 | B1 | 7/2013 | Cole | |
| 8,491,381 | B2 | 7/2013 | Nicely et al. | |
| 8,506,388 | B2 | 8/2013 | Walker et al. | |
| 8,517,818 | B2 | 8/2013 | Nicely et al. | |
| 8,550,892 | B2 | 10/2013 | Moody | |
| 8,672,736 | B1 | 3/2014 | Nicely | |
| 8,690,659 | B2 | 4/2014 | Moody | |
| 9,011,225 | B2 | 4/2015 | Brown et al. | |
| 9,011,226 | B2 | 4/2015 | Montano | |
| 9,129,486 | B2 | 9/2015 | Nicely et al. | |
| 9,138,634 | B2 | 9/2015 | Moody | |
| 9,472,063 | B2 | 10/2016 | Nicely et al. | |
| 9,524,614 | B2 | 12/2016 | Caputo et al. | |
| 9,542,814 | B2 | 1/2017 | Daniels | |
| 9,547,958 | B2 | 1/2017 | Cole et al. | |
| 2005/0170876 | A1 | 8/2005 | Masci et al. | |
| 2008/0076542 | A1 | 3/2008 | Iddings et al. | |
| 2008/0111309 | A1 | 5/2008 | Nicely et al. | |
| 2010/0004051 | A1 | 1/2010 | Walker et al. | |
| 2010/0081497 | A1 | 4/2010 | Wolf et al. | |
| 2010/0099480 | A1 | 4/2010 | Caputo | |
| 2010/0113122 | A1 | 5/2010 | Walker et al. | |
| 2010/0120484 | A1 | 5/2010 | Caputo et al. | |
| 2010/0137056 | A1 | 6/2010 | Hoffman et al. | |

(56) References Cited

U.S. PATENT DOCUMENTS

| | | | |
|---|---|---|---|
| 2011/0003627 | A1 | 1/2011 | Nicely et al. |
| 2011/0111818 | A1 | 5/2011 | Baerlocher |
| 2011/0114963 | A1 | 5/2011 | Son et al. |
| 2012/0214580 | A1 | 8/2012 | Hoffman et al. |
| 2012/0295683 | A1 | 11/2012 | Moody |
| 2013/0065669 | A1 | 3/2013 | Michaelson et al. |
| 2013/0072282 | A1 | 3/2013 | Nicely |
| 2013/0079110 | A1 | 3/2013 | Nicely et al. |
| 2013/0079123 | A1 | 3/2013 | Nicely et al. |
| 2013/0084961 | A1 | 4/2013 | Radisich et al. |
| 2013/0260869 | A1 | 10/2013 | Basallo et al. |
| 2014/0018146 | A1 | 1/2014 | Zielinski et al. |

* cited by examiner

GAMING SYSTEM AND METHOD PROVIDING A MULTI-PLAY GAME HAVING RANDOMLY-INCREASABLE AND RANDOMLY-DISTRIBUTABLE PERSISTENT MODIFIERS

PRIORITY CLAIM

This patent application claims priority to and the benefit of U.S. Provisional Patent Application No. 62/326,420, which was filed on Apr. 22, 2016, the entire contents of which are incorporated herein by reference.

COPYRIGHT NOTICE

A portion of the disclosure of this patent document contains or may contain material that is subject to copyright protection. The copyright owner has no objection to the photocopy reproduction by anyone of the patent document or the patent disclosure in exactly the form it appears in the U.S. Patent and Trademark Office patent file or records, but otherwise reserves all copyright rights.

BACKGROUND

Video poker has become very popular. One of the most common variations of video poker is Five Card Draw Poker. In general, for a play of a Five Card Draw Poker game, a gaming system deals a player a hand of five cards face up from a fifty-two card deck of playing cards. The gaming system enables the player to discard none of, one of, a plurality of but less than all of, or all of the five cards from the player's hand. The gaming system replaces each discarded card with another card from the deck. After replacing any discarded cards, the gaming system evaluates the cards of the player's hand against a paytable to determine whether the player's hand forms a winning hand associated with one of a plurality of different winning hand categories.

SUMMARY

Various embodiments of the present disclosure are directed to a gaming system and method providing a multi-play game having randomly-increasable and randomly-distributable persistent modifiers.

In various embodiments, the persistent modifiers are persistent multipliers. Generally, in certain such embodiments, the multi-play game has a plurality of separate outcome-generating elements (such as hands of cards or reel sets) and is associated with a plurality of separate multiplier banks Each multiplier bank is associated with a persistent multiplier maintained from game play to game play until distributed. When a random multiplier increase event occurs, the gaming system increases the persistent multiplier of at least one of the multiplier banks (such as a randomly-selected multiplier bank). When a random multiplier distribution event occurs for one of the multiplier banks, the gaming system distributes the persistent multiplier of that multiplier bank among the plurality of outcome-generating elements. The gaming system does so by determining a plurality of individual multipliers based on that persistent multiplier and assigning each individual multiplier to one of the outcome-generating elements. The gaming system uses the individual multipliers to modify any awards associated with their respective assigned outcome-generating elements.

More specifically, in one embodiment, the multi-play game is a multi-hand card game that has a plurality of hands and is associated with a plurality of multiplier banks Each multiplier bank is associated with a persistent multiplier. Upon player initiation of a play of the multi-hand card game, the gaming system randomly determines whether a multiplier distribution event occurred for one of the multiplier banks. If the multiplier distribution event occurred for one of the multiplier banks, the gaming system distributes the associated persistent multiplier among the plurality of hands. To do so, the gaming system divides that persistent multiplier into a plurality of individual multipliers and assigns each individual multiplier to one of the hands. The gaming system then resets that particular persistent multiplier to an initial value.

After distributing any persistent multiplier, the gaming system randomly determines and displays an initial primary hand of cards. The gaming system determines, based on the initial primary hand of cards, whether a multiplier increase event occurred. If the multiplier increase event occurred, the gaming system randomly selects one of the multiplier banks and increases the associated persistent multiplier (which the gaming system may provide during the next play). After increasing any persistent multiplier, the gaming system enables the player to discard none of, one of, a plurality of but less than all of, or all of the cards from the initial primary hand. The gaming system duplicates any cards held in the initial primary hand in each additional hand. The gaming system then completes each hand (if necessary) by adding one or more randomly-selected replacement cards. For each complete hand that is one of a plurality of different winning hands, the gaming system determines an award for that hand based in part on any individual multiplier associated with that hand.

Additional features and advantages are described herein, and will be apparent from, the following Detailed Description and the Figures.

DETAILED DESCRIPTION

Multi-Hand Card Game Having Randomly-Increasable and Randomly-Distributable Persistent Modifiers Various embodiments of the present disclosure are directed to a gaming system and method providing a multi-play game having randomly-increasable and randomly-distributable persistent modifiers. In various embodiments, the persistent modifiers are persistent multipliers. Generally, in certain such embodiments, the multi-play game has a plurality of separate outcome-generating elements (such as hands of cards or reel sets) and is associated with a plurality of separate multiplier banks Each multiplier bank is associated with a persistent multiplier maintained from game play to game play until distributed. When a random multiplier increase event occurs, the gaming system increases the persistent multiplier of at least one of the multiplier banks (such as a randomly-selected multiplier bank). When a random multiplier distribution event occurs for one of the multiplier banks, the gaming system distributes the persistent multiplier of that multiplier bank among the plurality of outcome-generating elements. The gaming system does so by determining a plurality of individual multipliers based on that persistent multiplier and assigning each individual multiplier to one of the outcome-generating elements. The gaming system uses the individual multipliers to modify any awards associated with their respective assigned outcome-generating elements.

1. Example Method

Figure 1A:
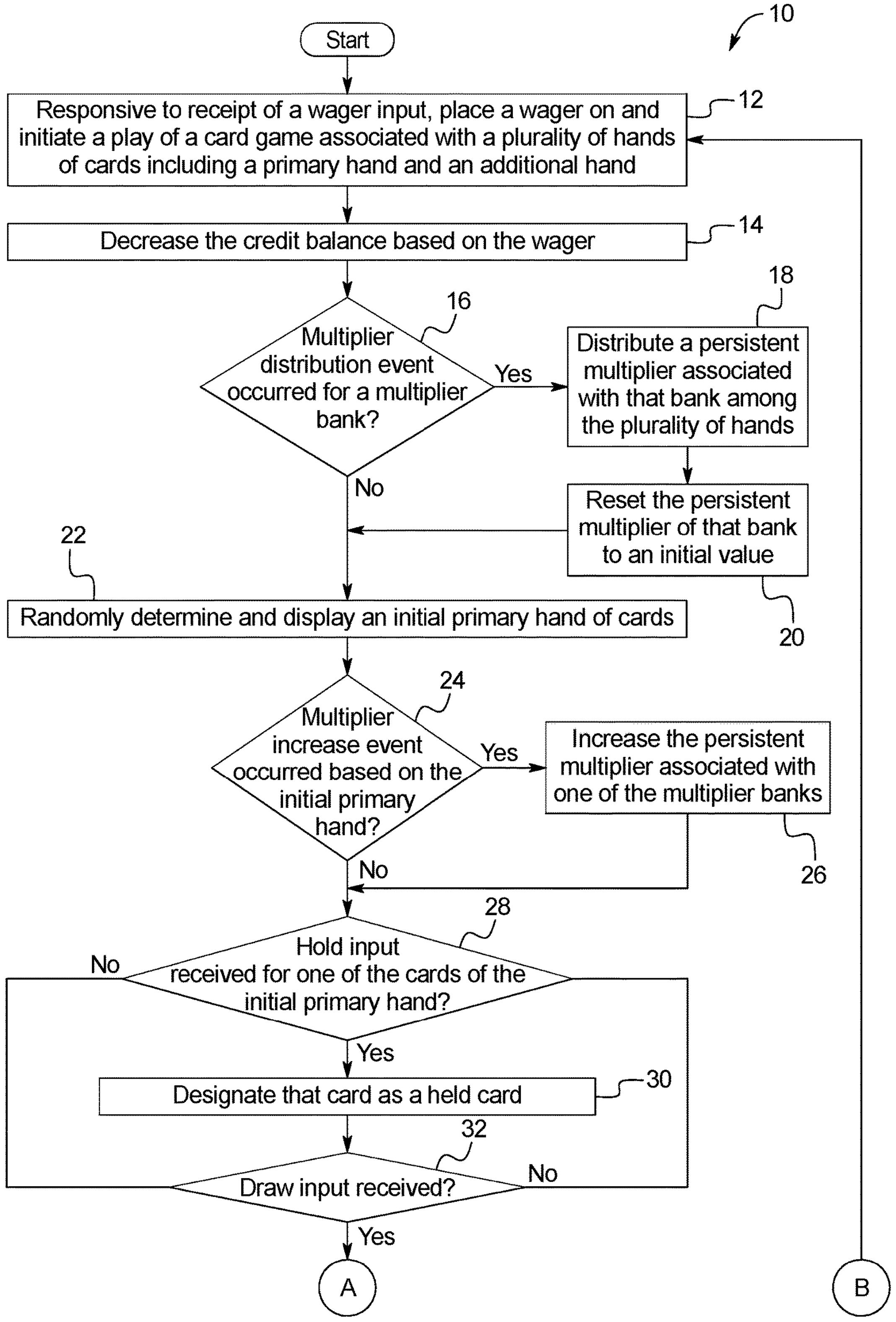
FIGS. 1A and 1B are flowcharts of an example process or method of operating a gaming system of the present disclosure to provide an example multi-hand card game having the randomly-increasable and randomly-distributable persistent modifier feature of the present disclosure.
Figure 1B:
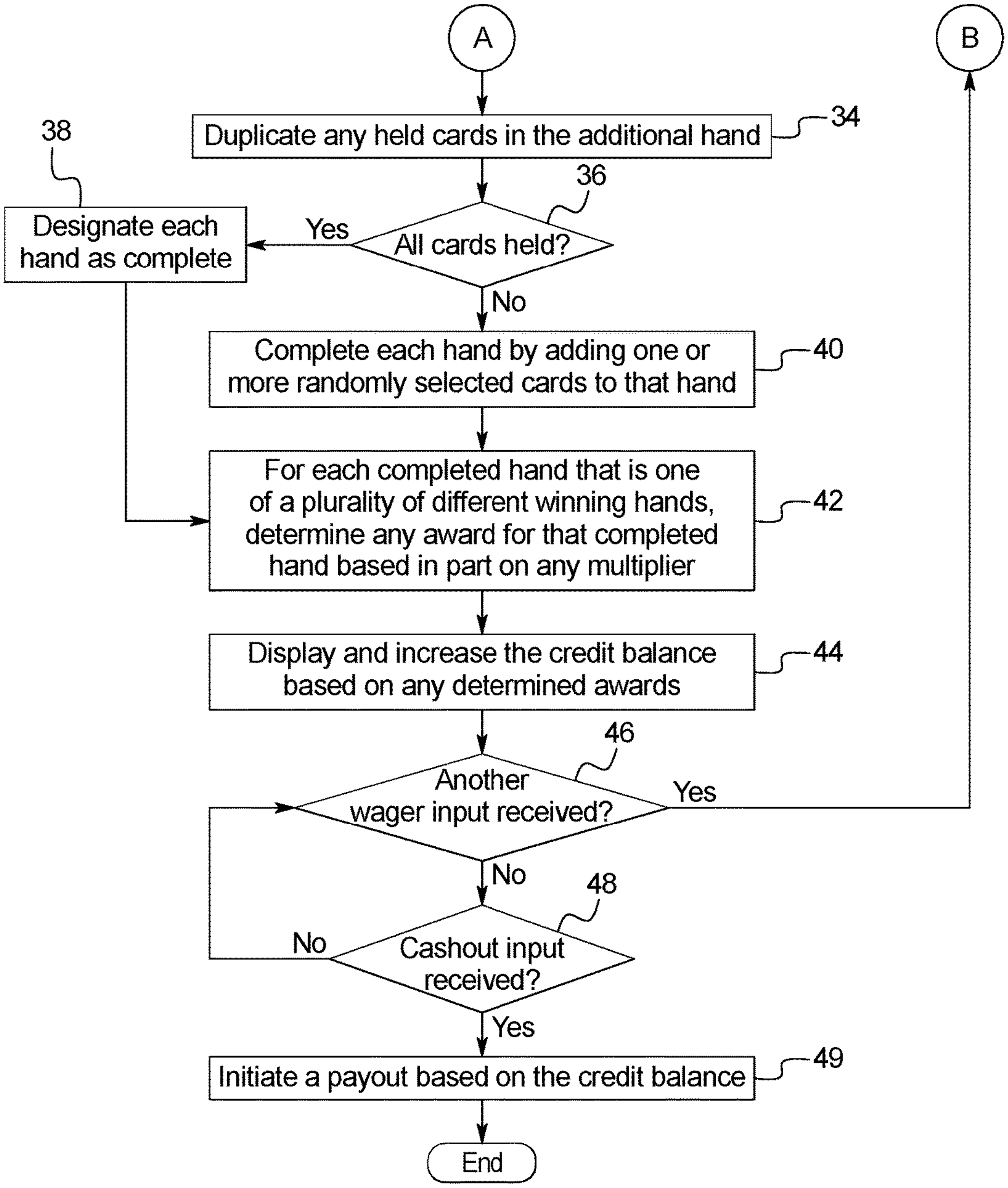

FIGS. 1A and 1B are flowcharts of an example process or method 10 of operating a gaming system of the present disclosure to provide an example multi-play game—here, a multi-hand card game—having the randomly-increasable and randomly-distributable persistent modifier feature of the present disclosure. Here, the persistent modifiers are persistent multipliers. In various embodiments, the process 10 is represented by a set of instructions stored in one or more memories and executed by one or more processors. Although the process 10 is described with reference to the flowcharts shown in FIGS. 1A and 1B, many other processes of performing the acts associated with this illustrated process 10 may be employed. For example, the order of certain of the illustrated blocks or diamonds may be changed, certain of the illustrated blocks or diamonds may be optional, or certain of the illustrated blocks or diamonds may not be employed.

In operation of this example embodiment, the process 10 begins after the gaming system establishes a credit balance for a player (such as after an acceptor of the gaming system receives physical currency or a physical ticket associated with a monetary value). The gaming system receives a wager input (such as an actuation of a wager button) and, in response, places a wager on and initiates a play of the multi-hand card game, as block 12 indicates. The multi-hand card game is associated with a plurality of hands each including a plurality of cards. The plurality of hands include a primary hand and an additional hand (or in other embodiments, multiple additional hands). The multi-hand card game is also associated with a plurality of multiplier banks. Each multiplier bank is associated with a persistent multiplier. The gaming system decreases the credit balance based on the wager, as block 14 indicates.

The gaming system determines whether a multiplier distribution event occurred for one of the multiplier banks, as diamond 16 indicates. If the gaming system determines at diamond 16 that the multiplier distribution event occurred for one of the multiplier banks, the gaming system distributes the associated persistent multiplier among the plurality of hands, as block 18 indicates. Here, the gaming system does so by determining a plurality of individual multipliers based on that persistent multiplier and assigning each individual multiplier to one of the hands. The gaming system then resets that persistent multiplier to an initial value, as block 20 indicates. The process 10 then proceeds to block 22 (described below).

If, on the other hand, the gaming system determines at diamond 16 that the multiplier distribution event did not occur for any of the multiplier banks, the gaming system randomly determines and displays an initial primary hand of cards, as block 22 indicates. The gaming system then determines, based on the initial primary hand, whether a multiplier increase event occurred, as diamond 24 indicates. If at diamond 24 the gaming system determines that the multiplier increase event occurred, the gaming system increases the persistent multiplier associated with one of the multiplier banks, as block 26 indicates. The process 10 then proceeds to diamond 28 (described below).

If, on the other hand, the gaming system determines at diamond 24 that the multiplier increase event did not occur, the gaming system monitors for receipt of a hold input (or inputs) or a draw input. This enables the player to choose which cards of the initial primary hand (if any) to hold and which cards of the initial primary hand (if any) to discard. If at diamond 28 the gaming system determines that a hold input identifying a particular card of the initial primary hand has been received, the gaming system designates that card as a held card, as block 30 indicates. The process 10 then proceeds to diamond 32. If at diamond 32 the gaming system determines that a draw input has not been received, the process 10 returns to diamond 28.

If the gaming system instead determines at diamond 32 that the draw input has been received, the gaming system duplicates any held cards in the additional hand (or each additional hand), as block 34 indicates. The gaming system determines whether all cards of the initial primary hand were held, as diamond 36 indicates. If the gaming system determines at diamond 36 that all cards of the initial primary hand were held, the gaming system designates each hand as complete, as block 38 indicates. The process 10 then proceeds to block 42 (described below).

If, on the other hand, the gaming system determines at diamond 36 that all cards of the initial primary hand were not held (i.e., that at least one card was discarded), the gaming system completes each hand by adding one or more randomly-selected cards to that hand, as block 40 indicates. For each completed hand that is one of a plurality of different winning hands, the gaming system determines any award for that completed hand, as block 42 indicates. If that completed hand is associated with a multiplier, the award is determined based in part on that multiplier, as block 42 also indicates. The gaming system displays and increases the credit balance based on any determined awards, as block 44 indicates.

The play of the multi-hand card game is complete following the award determination.

As diamonds 46 and 48 indicate, after the play of the multi-hand card game is complete, the gaming system monitors for receipt of another wager input or receipt of a cashout input (such as an actuation of a cashout button). If at diamond 46 the gaming system receives another wager input, the process 10 returns to block 12 (assuming the credit balance is large enough to place another wager). If at diamond 48 the gaming system receives a cashout input, the gaming system initiates a payout based on the credit balance (assuming a nonzero credit balance), as block 49 indicates, and the process 10 ends.

2. Example Gaming System Operation

FIGS. 2A to 2G illustrate screen shots of one example embodiment of a gaming system operating one example embodiment of a three-hand Jacks-or-Better Five Card Draw Poker Game (referred to in this Section 2 as the "multi-hand card game") having the randomly-increasable and randomly-distributable persistent modifier feature of the present disclosure. Here, the persistent modifiers are persistent multipliers. In this example embodiment, the player must pay a 15 credit fee in addition to placing a maximum 5 credit per hand wager to activate the randomly-increasable and randomly-distributable persistent multiplier feature.

In this example embodiment, the multi-hand card game is associated with two multiplier banks: Bank 1 160*a* and Bank 2 160*b*. Other embodiments may be associated with any suitable quantity of multiplier banks. These multiplier banks are associated with separate, individually increasable and individually distributable persistent multipliers. At this point, Bank 1 160*a* is associated with a 15× persistent multiplier and Bank 2 160*b* is associated with a 14× persistent multiplier.

In this example embodiment, for each play of the multi-hand card game in which the randomly-increasable and randomly-distributable persistent multiplier feature is active, upon initiation of that play, the gaming system randomly determines whether to provide one of the persistent multipliers. A multiplier distribution event occurs when the gaming system determines to provide one of the persistent multipliers.

In this example embodiment, the gaming system can only distribute one persistent multiplier per play. Here, the gaming system starts with the largest persistent multiplier and sequentially determines whether to distribute that persistent multiplier until either: (1) the gaming system determines to distribute a persistent multiplier, in which case the gaming system does so and doesn't make any further determinations for that play; or (2) the gaming system determines not to distribute any persistent multipliers.

The gaming system makes these random determinations as to whether to whether to distribute a given persistent multiplier based on a weighted probability table. Here, the probability of the multiplier distribution event occurring increases as the values of the persistent multipliers increase (or vice-versa in other embodiments). For instance, in this example embodiment: (1) a 1×-2× persistent multiplier has a 0.1% probability of being distributed; (2) a 3×-5× persistent multiplier has a 0.2% probability of being distributed; (3) a 6×-8× persistent multiplier has a 0.3% probability of being distributed; (4) a 9×-11× persistent multiplier has a 15% probability of being distributed; (5) a 12×-14× persistent multiplier has a 30% probability of being distributed; (6) a 15×-17× persistent multiplier has a 40% probability of being distributed; (7) a 18×-20× persistent multiplier has a 50% probability of being distributed; (8) a 21×-26× persistent multiplier has a 60% probability of being distributed; (9) a 27×-32× persistent multiplier has an 80% probability of being distributed; and (10) a 33×-36× persistent multiplier has a 100% probability of being distributed. This is merely one example, and these persistent multiplier ranges and associated probabilities may differ in other embodiments.

In further embodiments, however, the probability of the multiplier distribution event occurring does not change from play to play, regardless of the values of the persistent multipliers. That is, the probability of occurrence of the multiplier distribution event may or may not depend on the values of the persistent multipliers, depending on the embodiment.

When the multiplier distribution event occurs in this example embodiment (i.e., when the gaming system determines to distribute a particular persistent multiplier), the gaming system distributes the associated persistent multiplier. Here, the gaming system does so by determining a plurality of individual multipliers based on that persistent multiplier and assigning each individual multiplier to a different hand. Specifically, the gaming system divides the persistent multiplier by the quantity of hands (three in this example embodiment) to create individual multipliers and then assigns each individual multiplier to a different one of the hands. For instance, if the persistent multiplier is 12×, the gaming system divides the 12× persistent multiplier by three (the quantity of hands) to create three individual 4× multipliers and assigns each individual 4× multiplier to a different one of the three hands.

If the persistent multiplier is not evenly divisible by the quantity of hands, the gaming system adds the remainder to the primary hand's individual multiplier. For instance, if the gaming system is distributing a 13× persistent multiplier, the gaming system: (1) divides the 13× persistent multiplier by three (the quantity of hands) to create three 4× individual multipliers with a 1× remainder; (2) assigns each 4× individual multiplier to a different one of the three hands; and (3) assigns the 1× remainder to the primary hand. This increases the primary hand's individual multiplier from 4× to 5×.

After distributing a persistent multiplier, the gaming system resets that persistent multiplier to an initial value. In this example embodiment, the gaming system randomly selects the initial value from a set of a plurality of different initial values using weighted probability tables. The set may include any suitable quantity of any suitable initial values. Here, the probability of selecting an initial value decreases as that initial value increases. For instance, in this example embodiment the set of initial values includes 3× and 12×. The probability of the gaming system randomly selecting the 3× initial value (e.g., 80%) is greater than the probability of the gaming system randomly selecting the 12× initial value (e.g., 20%). In other embodiments, the probability of selecting an initial value decreases as that initial value increases. In further embodiments, each (or at least two) initial value is associated with the same probability of being selected.

If the multiplier distribution event doesn't occur for a play of the multi-hand card game, the persistent multipliers persist to the next play of the multi-hand card game.

The multi-hand card game is also associated with a plurality of multiplier increase events that occur based on the cards of the initial primary hand when the randomly-increasable and randomly-distributable persistent multiplier feature is active. The multiplier increase events in this example embodiment are independent of the multiplier distribution event. In other words, the occurrence (or non-occurrence) of the multiplier distribution event doesn't affect the occurrence (or non-occurrence) of any of the multiplier increase events, and vice-versa. Table 2 lists the multiplier increase events for this example embodiment. Other embodiments may have more or fewer multiplier increase events, and the multiplier increase events may be associated with any suitable increase amounts. Here, when one of the multiplier increase events occurs, the gaming system: (1) randomly chooses one of the multiplier banks (i.e., Bank 1 160*a* or Bank 2 160*b*); and (2) increases the persistent multiplier associated with the randomly-chosen multiplier bank by the increase amount associated with that particular multiplier increase event. That increased persistent multiplier is available for the gaming system to (possibly) distribute in the next play.

TABLE 2

Multiplier Increase Events

| Multiplier Increase Event | Increase Amount |
| --- | --- |
| Initial primary hand is a Royal Flush | 15× |
| Initial primary hand is a Straight Flush | 15× |
| Initial primary hand is a Four of a Kind | 15× |
| Initial primary hand is a Full House | 15× |
| Initial primary hand is a Flush | 14× |
| Initial primary hand is a Straight | 13× |
| Initial primary hand is a Three of a Kind | 12× |
| Initial primary hand is a Two Pair | 11× |
| Initial primary hand is a Jacks or Better | 7× |
| Initial primary hand is a Pair of 6's through 10's | 3× |
| Initial primary hand is a Pair of 2's through 5's | 2× |

In this example embodiment, no persistent multiplier can exceed a maximum value, which is 36× (but could be any suitable value). Here, if a selected persistent multiplier would exceed 36× following the occurrence of a multiplier increase event, the gaming system: (1) uses part of the increase amount to increase the selected persistent multiplier to 36×; and (2) increases another (non-initially selected) persistent multiplier by the remaining increase amount. For instance, consider a situation in which Bank 1 160*a* has a 30× persistent multiplier, Bank 2 160*b* has a 10× persistent multiplier, the initial primary hand is a Three of a Kind, and the gaming system randomly determines to increase the persistent multiplier of Bank 1 160*a*. Here, the gaming system can't add all of the 12× increase amount to the persistent multiplier of Bank 1 160*a* since that persistent multiplier would exceed 36×. Accordingly, the gaming system: (1) increases the persistent multiplier of Bank 1 160*a* to 36× using 6× of the 12× increase amount; and (2) increases the persistent multiplier of Bank 2 160*b* (the only other multiplier bank) to 16× using the remaining 6× of the 12× increase amount.

If both persistent multipliers are the maximum value (36× in this example embodiment), the gaming system accumulates the remaining increase amount (not used to increase the persistent multipliers) into an overflow multiplier bank. Following the next occurrence of a multiplier distribution event, the gaming system adds the value of the overflow multiplier bank to the initial value to which the provided persistent multiplier is reset. The gaming system may accumulate any remaining increase amounts into the overflow multiplier bank over multiple game plays.

For instance, consider a situation in which Bank 1 160*a* has a 35× persistent multiplier, Bank 2 160*b* has a 30× persistent multiplier, the initial primary hand is a Three of a Kind, and the gaming system randomly determines to increase the persistent multiplier of Bank 1 160*a*. Here, the gaming system can't add all of the 12× increase amount to the persistent multiplier of Bank 1 160*a* since that persistent multiplier would exceed 36×. Accordingly, the gaming system increases the persistent multiplier of Bank 1 160*a* to 36× using 1× of the 12× increase amount. But the gaming system can't add all of the remaining 11× of the increase amount to the persistent multiplier of Bank 2 160*b* since that persistent multiplier would exceed 36×. Accordingly, the gaming system: (1) increases the persistent multiplier of Bank 2 160*b* to 36× using 6× of the remaining 11× of the increase amount; and (2) accumulates the remaining 5× of the increase amount into the overflow multiplier bank. Here, the next time the multiplier distribution event occurs, the gaming system will select an initial value to which the gaming system will reset the distributed persistent multiplier, and then add the 5× in the overflow multiplier bank to the initial value.

The gaming system displays a plurality of buttons actuatable via a touch screen including: (1) a SEE PAYS button 171, (2) a MORE GAMES button 172, (3) a SPEED button 173, (4) a BET ONE button 174, (5) a BET MAX button 175, a DEAL button 176, and (7) a DRAW button 137. When the gaming system receives an actuation of the SEE PAYS button 171, if the paytable for the multi-hand card game is not displayed, the gaming system displays the paytable, and if the paytable is displayed, the gaming system stops displaying the paytable. When the gaming system receives an actuation of the MORE GAMES button 172, the gaming system displays a menu of additional games the player can play via the gaming system. When the gaming system receives an actuation of the SPEED button 173, the gaming system increases or decreases the speed at which the gaming system displays plays of the multi-hand card game. When the gaming system receives an actuation of the BET ONE button 174, the gaming system increases the player's wager by 1 credit per hand. When the gaming system receives an actuation of the BET MAX button 175, the gaming system increases the player's wager to the maximum 30 credit wager (5 credits per hand plus 15 credits to activate the randomly-increasable and randomly-distributable persistent multiplier feature). When the gaming system receives an actuation of the DEAL button 176, the gaming system places a wager and initiates a play of the multi-hand card game. When the gaming system receives an actuation of the DRAW button 177, the gaming system completes all hands, as described below.

The gaming system also displays a plurality of meters including: (1) a credit meter 181 that indicates the player's credit balance, (2) a wager meter 182 that displays the player's total wager for a play of the multi-hand card game, and (3) an award meter 183 that displays any awards won for a play of the multi-hand card game. While in this example embodiment the gaming system indicates the player's credit balance, the player's wager, and any awards in credits, the gaming system may also indicate them in amounts of currency.

Figure 2A:
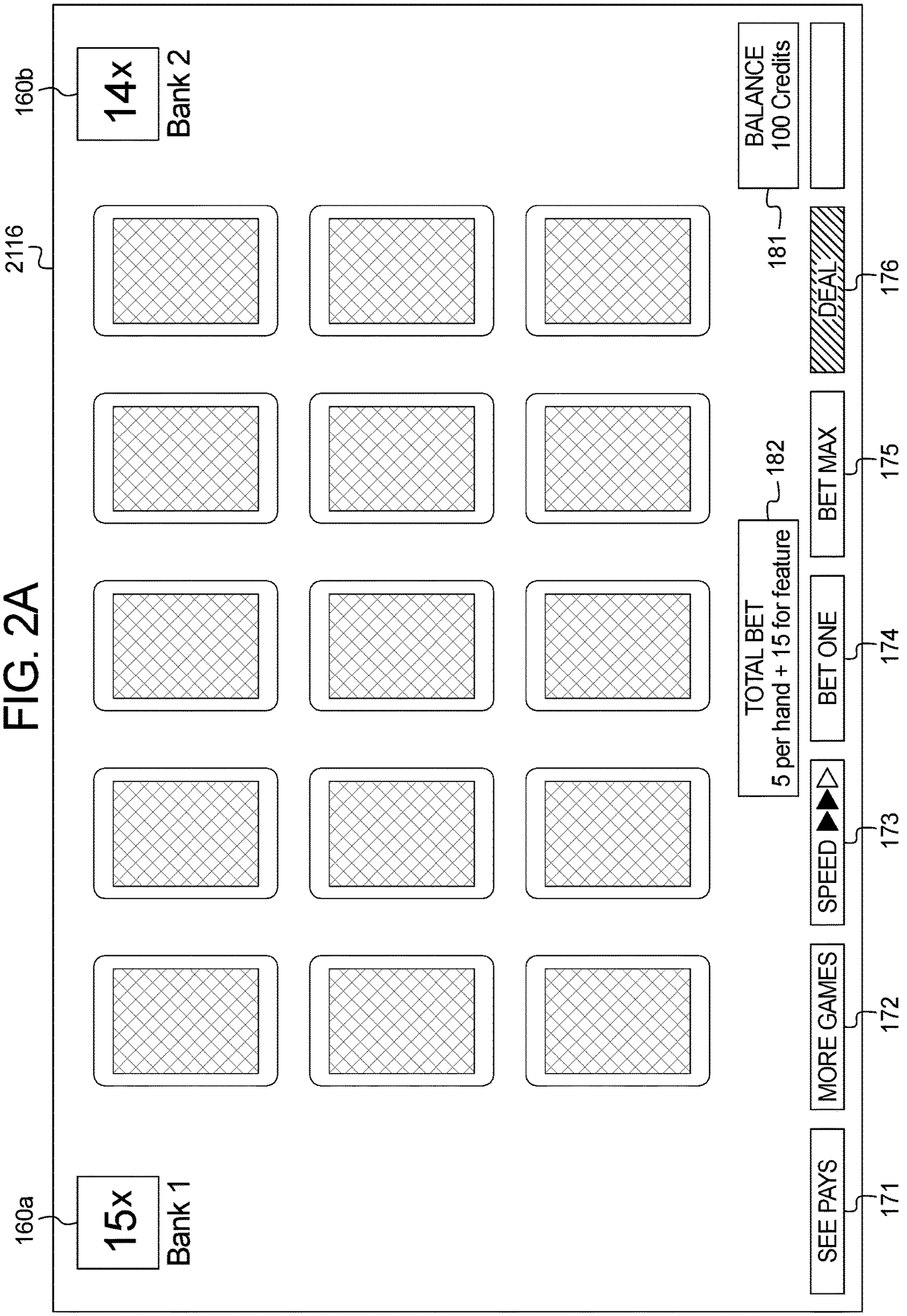
FIGS. 2A, 2B, 2C, 2D, 2E, 2F, and 2G illustrate screen shots of one example embodiment of a gaming system operating one example embodiment of a multi-hand card game having the randomly-increasable and randomly-distributable persistent modifier feature of the present disclosure.

As illustrated in FIG. 2A, in this example embodiment, the gaming system receives value, such as physical currency (or its equivalent), via an acceptor. Here, the gaming system provides the player 100 credits, which represents the received value, and displays the player's credit balance of 100 credits in the credit meter 181. The gaming system receives an actuation of the DEAL button 176.

Figure 2B:
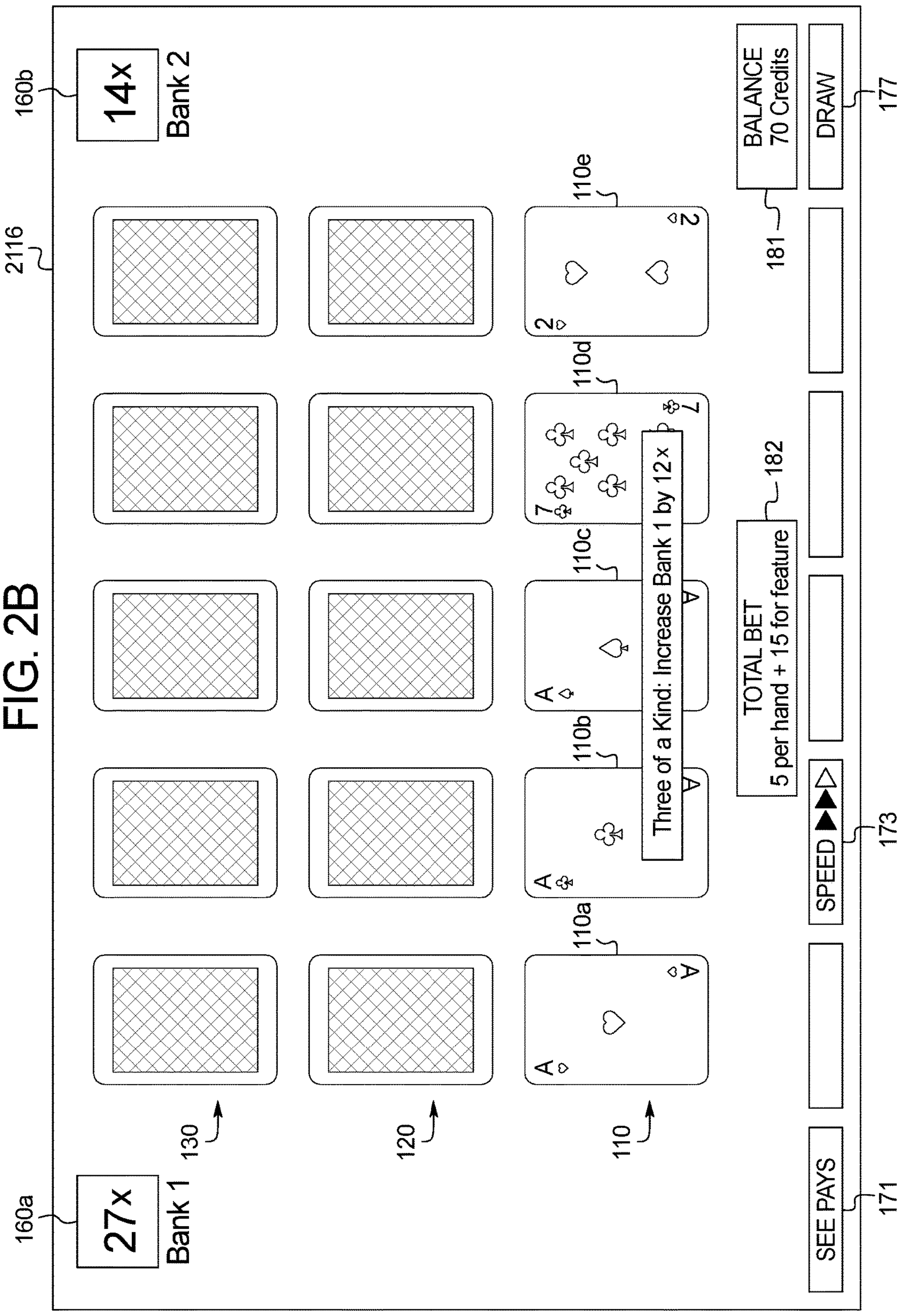

As illustrated in FIG. 2B, the gaming system places a 30 credit bet (5 credits on each hand plus 15 credits to activate the randomly-increasable and randomly-distributable persistent multiplier feature) and decreases the credit balance by the 30 credit bet from 100 credits to 70 credits.

The gaming system then randomly determines (based on a weighted table, as explained above): (1) that the multiplier distribution event does not occur for the 15× persistent multiplier of Bank 1 160*a* (i.e., the larger persistent multiplier at this point); and (2) that the multiplier distribution event does not occur for the 14× persistent multiplier of Bank 2 160*b*. The gaming system therefore does not distribute any persistent multiplier for this play.

The gaming system randomly determines and displays an initial primary hand 110 of five cards including A♥ 110*a*, A♣ 110*b*, A♠ 110C, 7♣ 110*d*, and 2♥ 110*e*. In this example embodiment, the gaming system randomly selects these five cards from a standard deck of fifty-two conventional playing cards, though the gaming system may randomly select the cards from any suitable deck including any suitable cards.

At this point, the gaming system determines based on the five cards 110*a* to 110*e* whether one of the multiplier increase events occurred. Since the cards 110*a* to 110*e* of the initial primary hand 110 form a Three of a Kind (via A♥, 110*a*, A♣ 110*b*, and A♠ 110*c*), the gaming system determines that one of the multiplier increase events occurred. The gaming system randomly selects Bank 1 160*a* and increases the associated persistent multiplier by 12× (i.e., the increase amount associated with Three of a Kind) from 15× to 27×.

Figure 2C:
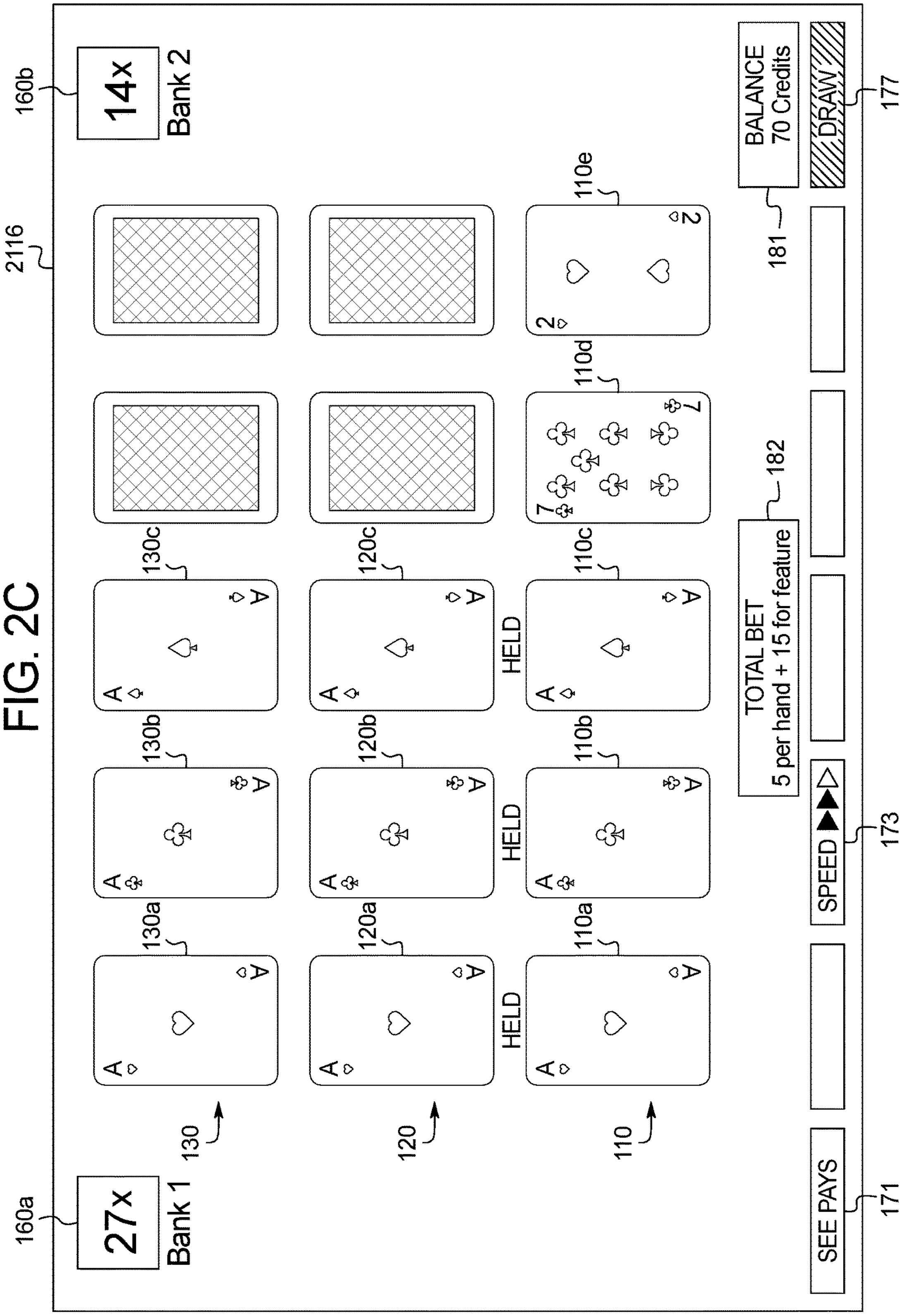

The gaming system enables the player to choose none of, one of, a plurality of but less than all of, or all of the cards of the initial primary hand to hold. As described below, the gaming system discards any non-held cards from the initial primary hand and replaces any discarded cards with replacement cards. As illustrated in FIG. 2C, the gaming system receives a selection of A♥ 110*a*, A♣ 110*b*, and A♠ 110*c* from the initial primary hand 110 to hold, and designates those cards as held cards. The gaming system duplicates the held A♥, A♣, and A♠ into each additional hand 120 and 130, which are incomplete at this point. The gaming system receives an actuation of the DRAW button 177.

Figure 2D:
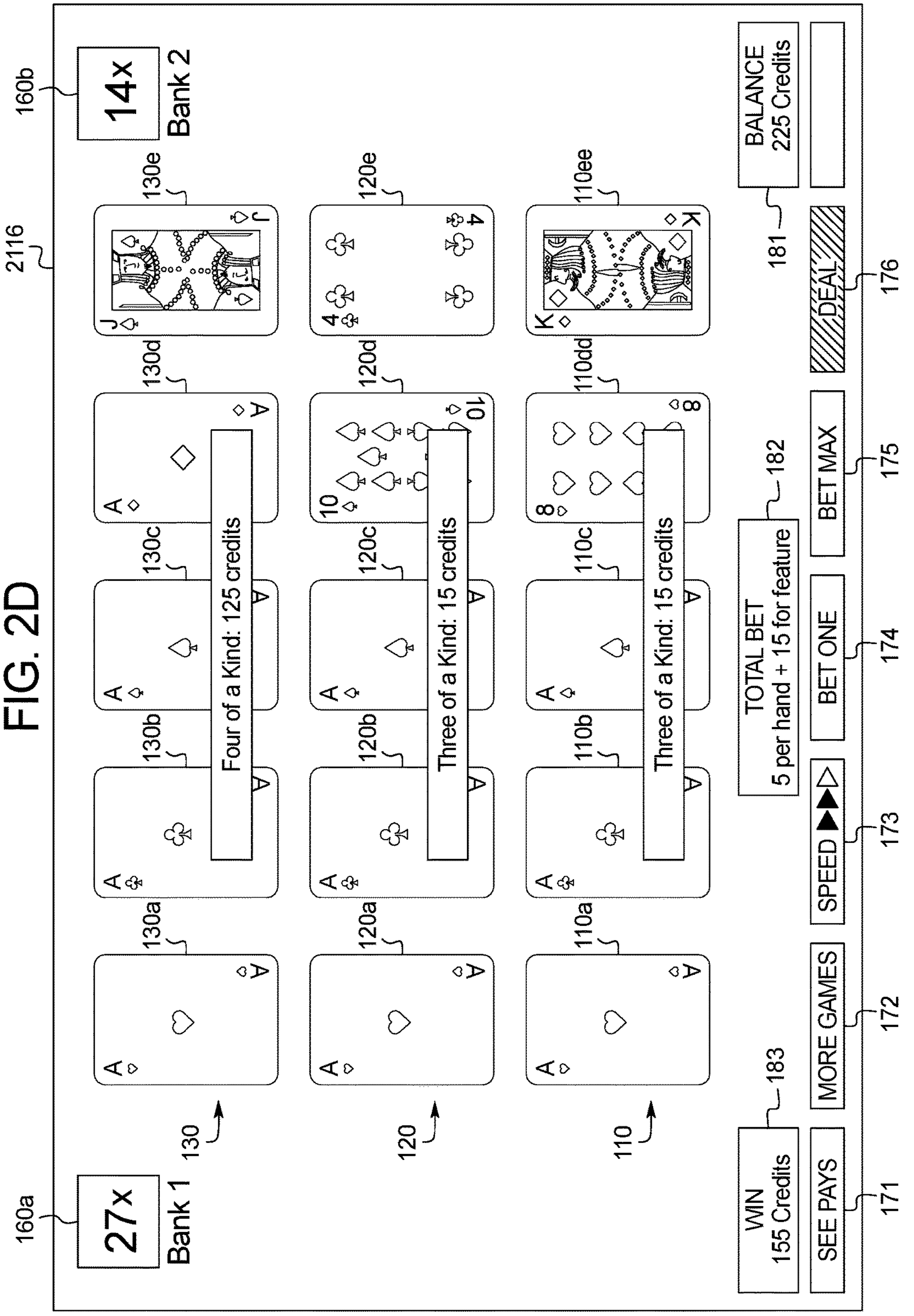

As illustrated in FIG. 2D, with respect to the primary hand 110, the gaming system forms a complete primary hand by randomly determining replacement cards 8♥ 110*dd* and K♦ 110*ee* and respectively replacing the discarded (i.e., non-held) 7♣ 110*d* and 2♥ 110*e* with these replacement cards. The gaming system randomly selects the replacement cards from the cards remaining in the deck from which the gaming system selected the five initial cards for the initial primary hand 110. For each incomplete additional hand, the gaming system completes that additional hand by randomly determining two additional cards and adding those two additional cards to that incomplete additional hand to form a complete additional hand. Each completed hand includes the same quantity of cards. In this example embodiment, the gaming system randomly selects the additional cards used to complete the additional hands from separate decks. That is, in this example embodiment, each additional hand is associated with a separate deck from which the gaming system selects the additional cards to add to that additional hand. In other embodiments, the gaming system completes the incomplete additional hands in other suitable manners.

In this example embodiment: (1) completed additional hand 120 includes A♥ 120*a*, A♣ 120*b*, A♠ 120*c*, 10♠ 120*d*, and 4♣ 120*e*; and (2) completed additional hand 130 includes A♥ 130*a*, A♣ 130*b*, A♠ 130*c*, A♦ 130*d*, and J♠ 130*e*.

The gaming system determines an award for each completed hand that forms a winning hand according to Table 3 below. Here, each completed hand forms a winning hand. The gaming system determines: (1) a 15 credit award for completed primary hand 110 (for the Three of a Kind); (2) a 15 credit award for completed additional hand 120 (for the Three of a Kind); and (3) a 125 credit award for completed additional hand 130 (for the Four of a Kind). The gaming system increases the credit balance by 155 credits from 70 credits to 225 credits, and displays the 155 credit award in the award meter 183. This is merely one example paytable, and the gaming system may employ any suitable paytable.

TABLE 3

Winning Hand Categories, Example Winning Hands, and Awards for Example Multi-Hand Card Game

| Winning Hand Category | Example Winning Hand | Award (5 credit bet) |
|---|---|---|
| Royal Flush | A♣ K♣ Q♣ J♣ 10♣ | 1250 |
| Straight Flush | 10♣ 9♣ 8♣ 7♣ 6♣ | 250 |
| Four of a Kind | J♣ J♥ J♦ J♠ 3♣ | 125 |
| Full House | A♥ A♦ A♣ 6♦ 6♣ | 45 |
| Flush | A♣ J♣ 8♣ 6♣ 2♣ | 30 |
| Straight | 8♦ 7♣ 6♠ 5♠ 4♣ | 20 |
| Three of a Kind | Q♠ Q♥ Q♦ 6♦ 2♠ | 15 |
| Two Pair | 8♦ 8♥ 5♥ 5♣ 2♠ | 10 |
| Jacks or Better | K♦ K♠ 8♣ 7♣ 2♥ | 5 |

Figure 2E:
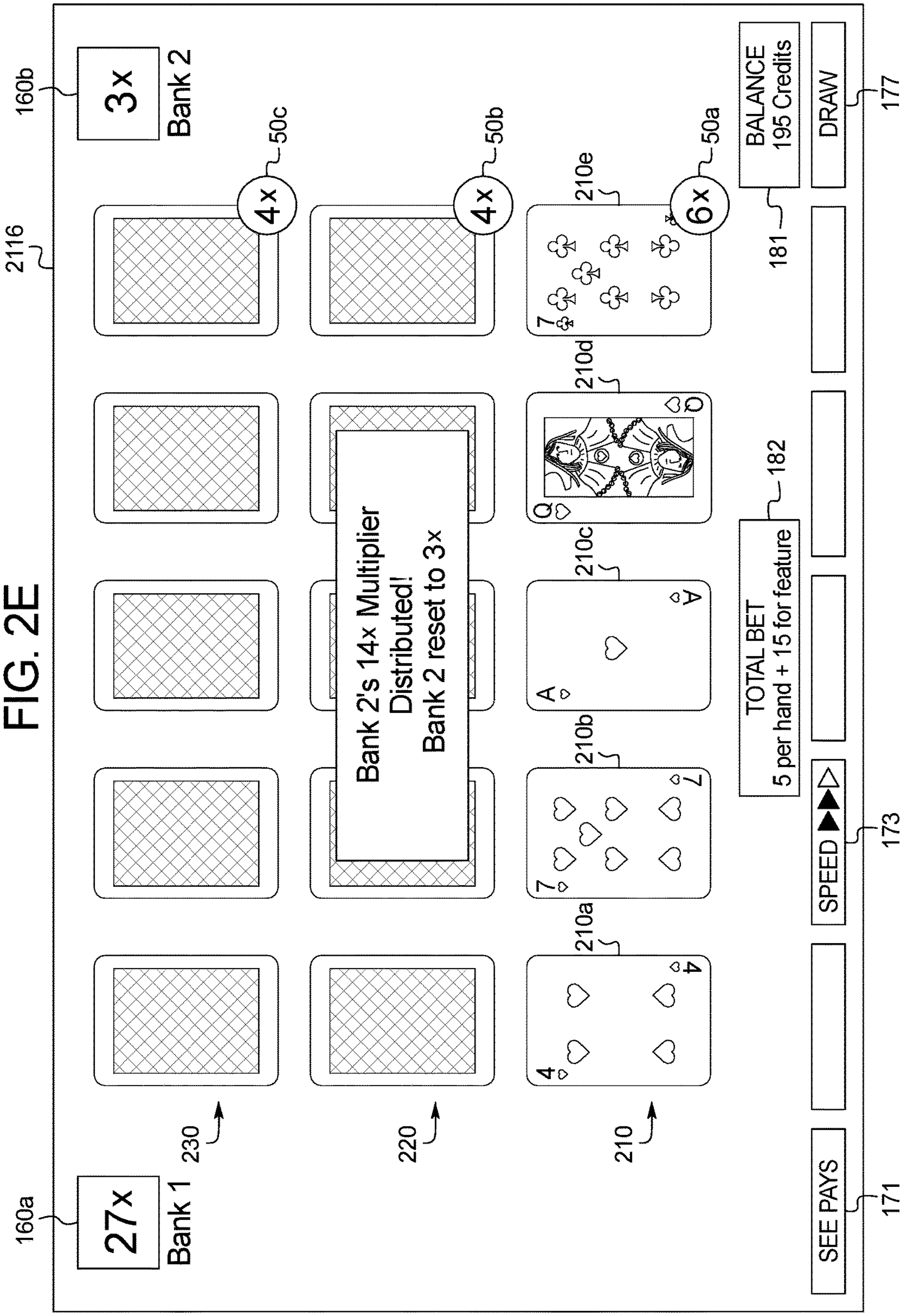

The gaming system receives another actuation of the DEAL button 176. As illustrated in FIG. 2E, the gaming system places another 30 credit bet (5 credits on each hand plus 15 credits to activate the randomly-increasable and randomly-distributable persistent multiplier feature) and decreases the credit balance by the 30 credit bet from 225 credits to 195 credits.

The gaming system then randomly determines (based on a weighted table, as explained above): (1) that the multiplier distribution event does not occur for the 27× persistent multiplier of Bank 1 160*a* (i.e., the larger persistent multiplier at this point); and (2) that the multiplier distribution event occurs for the 14× persistent multiplier of Bank 2 160*b*. The gaming system distributes the associated 14× persistent multiplier among the primary hand 210 and the additional hands 220 and 230 by: (1) dividing the 14× persistent multiplier by three (the quantity of hands) to create three 4× individual multipliers with a 2× remainder; (2) assigning each 4× individual multiplier to a different one of the three hands 210, 220, and 230; and (3) assigning the 2× remainder to the primary hand 210, which increases the primary hand's individual multiplier from 4× to 6×. After the persistent multiplier distribution, the primary hand 210 is assigned a 6× individual multiplier 50*a*, the additional hand 220 is assigned a 4× individual multiplier 50*b*, and the additional hand 230 is assigned a 4× individual multiplier 50*c*.

The gaming system randomly determines and displays the initial primary hand 210 of five cards including 4♥ 210*a*, 7♥ 210*b*, A♥ 210*c*, Q♥ 210*d*, and 7♣ 210*e*. At this point, the gaming system determines based on the five cards 210*a* to 210*e* whether one of the multiplier increase events occurred. Since the cards 210*a* to 210*e* of the initial primary hand 210 don't form any of the combinations in Table 2, the gaming system determines that none of the multiplier increase events occurred.

Figure 2F:
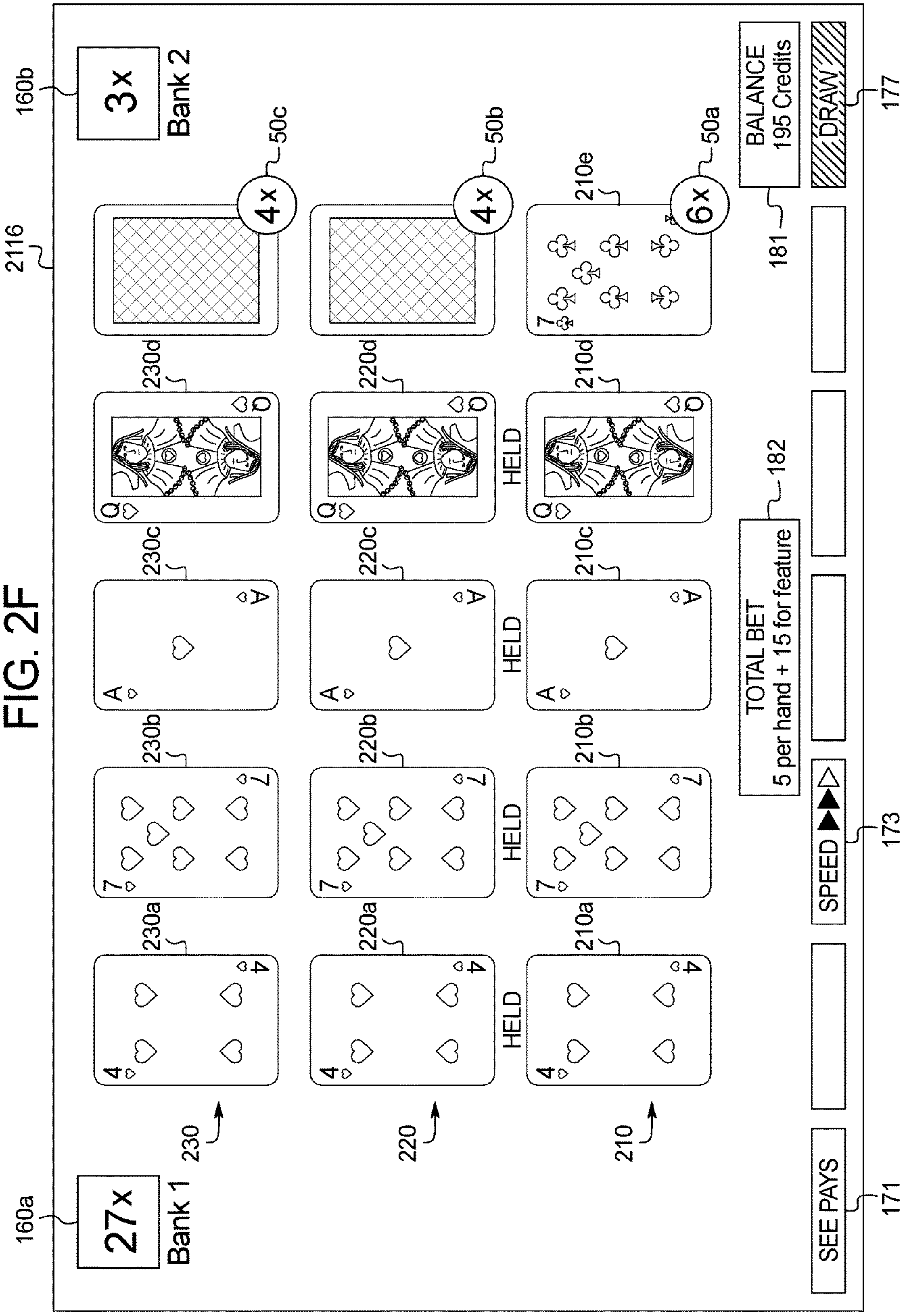

The gaming system enables the player to choose none of, one of, a plurality of but less than all of, or all of the cards of the initial primary hand to hold. As illustrated in FIG. 2F, the gaming system receives a selection of 4♥ 210*a*, 7♥ 210*b*, A♥ 210*c*, and Q♥ 210*d* from the initial primary hand 210 to hold, and designates those cards as held cards. The gaming system duplicates the held 4♥, 7♥, A♥, and Q♥ into each additional hand 220 and 230, which are incomplete at this point. The gaming system receives an actuation of the DRAW button 177.

Figure 2G:
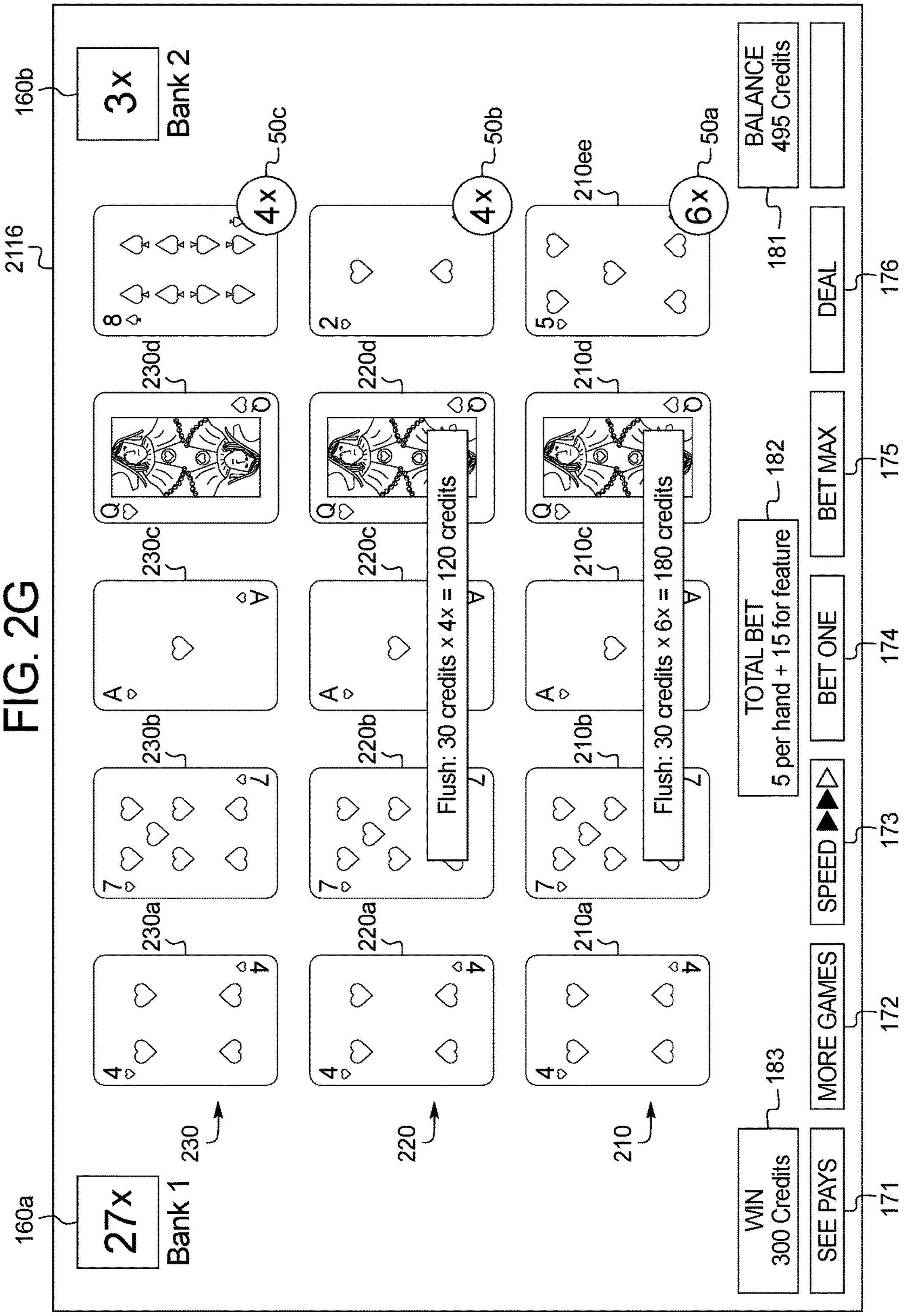

As illustrated in FIG. 2G, with respect to the primary hand 210, the gaming system forms a complete primary hand by randomly determining replacement card 5♥ 110*ee* and replacing the discarded (i.e., non-held) 7♣ 210*e* with this replacement card. The gaming system randomly selects the replacement card from the cards remaining in the deck from which the gaming system selected the five initial cards for the initial primary hand 210. For each incomplete additional hand, the gaming system completes that additional hand by randomly determining one additional card and adding that one additional card to that incomplete additional hand to form a complete additional hand.

In this example embodiment: (1) completed additional hand 220 includes 4♥ 220*a*, 7♥ 220*b*, A♥ 220*c*, Q♥ 220*d*, and 2♥ 220*e*; and (2) completed additional hand 230 includes 4♥ 230*a*, 7♥ 230*b*, A♥ 230*c*, Q♥230*d*, and 8♠ 230*e*.

The gaming system determines an award for each completed hand that forms a winning hand according to Table 3 above. Here, completed primary hand 210 and completed additional hand 220 form winning hands. The gaming system determines: (1) a 180 credit award for completed primary hand 210 (30 credits for the Flush×6× individual multiplier 50*a*); and (2) a 120 credit award for completed additional hand 220 (30 credits for the Flush×4× individual multiplier 50*b*). The gaming system increases the credit balance by 300 credits from 195 credits to 495 credits, and displays the 300 credit award in the award meter 183.

This example embodiment of the persistent modifier feature improves gaming technology by providing a way for gaming establishment operators to increase player retention and profitability while improving player experience. The persistent modifier feature incentivizes players to remain at EGMs and keep playing to attempt to trigger a persistent modifier and reap the benefits. And if the player doesn't do so, the player can still trigger an increase of the persistent modifier, which further incentivizes the player to remain at the EGM and continue playing. The persistent modifier feature thus provides two different types of anticipatory events that increase player enjoyment and induce them to remain at EGMs: triggering the disbursement of a persistent modifier or triggering an increase in a persistent modifier. This solves the problem of player fatigue and boredom by ensuring players have multiple different, random events to anticipate during game play. Further, the average expected payback percentage of the game including the persistent modifier feature can be configured to provide the player an excellent gaming experience while providing the gaming establishment a profit.

3. Variations

The gaming system may implement the randomly-increasable and randomly-distributable persistent modifier feature with any suitable game other than a multi-hand card game that includes a plurality of distinct outcome-generating elements, such as a multi-play reel-based game having a plurality of distinct reel sets (i.e., distinct outcome-generating elements) or a multi-play keno game having a plurality of distinct ball draws.

In certain embodiments, the randomly-increasable and randomly-distributable persistent modifier feature is always active. In other embodiments (such as that described above with respect to FIGS. 2A to 2G), the gaming system only activates the randomly-increasable and randomly-distributable persistent modifier feature if the gaming system receives an activation fee or a wager exceeding a particular threshold. In other embodiments, a player must have a player tracking level above a suitable threshold to activate the randomly-increasable and randomly-distributable persistent modifier feature.

The modifier distribution event is described above as being a random mystery event that is independent of game play. In other embodiments, however, the modifier distribution event is based on at least one event associated with game play.

For instance, in various embodiments in which the game is a multi-hand card game, the modifier distribution event occurs when: (1) the primary hand includes a designated card (e.g., the A♠) or one of a plurality of different designated cards (e.g., one of the A♥, A♦, A♣, and A♠) post-deal but pre-draw; (2) the primary hand includes a designated combination of cards (e.g., a Flush) or one of a plurality of different designated combinations of cards (e.g., any winning hand) post-deal but pre-draw; (3) the primary hand includes a designated card (e.g., the A♠) or one of a plurality of different designated cards (e.g., one of the A♥, A♦, A♣, and A♠) post-draw; (4) the primary hand includes a designated combination of cards (e.g., a Flush) or one of a plurality of different designated combinations of cards (e.g., any winning hand) post-draw; (5) one of the additional hands includes a designated card (e.g., the A♠) or one of a plurality of different designated cards (e.g., one of the A♥, A♦, A♣, and A♠) post-draw; (6) one of the additional hands includes a designated combination of cards (e.g., a Flush) or one of a plurality of different designated combinations of cards (e.g., any winning hand) post-draw; (7) each hand includes the same designated card (e.g., the A♠), the same one of a plurality of different designated cards (e.g., the same one of the A♥, A♦, A♣, and A♠), or one of a plurality of different designated cards (e.g., any one of the A♥, A♦, A♣, and A♠) post-draw; (8) each hand includes the same designated combination of cards (e.g., a Flush), the same one of a plurality of different designated combinations of cards (e.g., the same one of a Flush, a Full House, or a Four of a Kind), or one of a plurality of different designated combinations of cards (e.g., any one of a Flush, a Full House, or a Four of a Kind) post-draw; (9) a designated quantity of the hands each include the same designated card (e.g., the A♠), the same one of a plurality of different designated cards (e.g., the same one of the A♥, A♦, A♣, and A♠), or one of a plurality of different designated cards (e.g., any one of the A♥, A♦, A♣, and A♠) post-draw; (10) a designated quantity of the hands each include the same designated combination of cards (e.g., a Flush), the same one of a plurality of different designated combinations of cards (e.g., the same one of a Flush, a Full House, or a Four of a Kind), or one of a plurality of different designated combinations of cards (e.g., any one of a Flush, a Full House, or a Four of a Kind) post-draw; or (11) the hands collectively include cards forming a designated combination of cards post-draw (e.g., the hands include cards that collectively form a Royal Flush).

For example, in various embodiments in which the game is a multi-play reel-based game associated with a plurality of different reel sets, the modifier distribution event occurs when: (1) a particular reel set displays a designated symbol or one of a plurality of different designated symbols post-spin; (2) a particular reel set displays a designated symbol combination or one of a plurality of different designated symbol combinations post-spin; (3) each reel set displays the same designated symbol, the same one of a plurality of different designated symbols, or any one of a plurality of different designated symbols post-spin; (4) each reel set displays the same designated symbol combination, the same one of a plurality of different designated symbol combinations, or any one of a plurality of different designated symbol combinations post-spin; (5) a designated quantity of the reel sets each display the same designated symbol, the same one of a plurality of different designated symbols, or any one of a plurality of different designated symbols post-spin; (6) a designated quantity of the reel sets each display the same designated symbol combination, the same one of a plurality of different designated symbol combinations, or any one of a plurality of different designated symbol combinations post-spin; or (7) the reel sets collectively display symbols forming a designated symbol combination post-spin.

In other embodiments, the modifier distribution event occurs when: (1) a play of the game results in a win of a designated award or award amount (such as a progressive award or an award of at least a designated value); (2) a total quantity of plays of the game initiated during a gaming session reaches a designated quantity of plays; (3) the gaming system receives a deposit of value to fund the credit balance at least a designated quantity of times during a gaming session; (4) total coin-in during a gaming session reaches a designated coin-in; (5) a total amount of credits or currency won during a gaming session reaches a designated amount; (6) a total amount of credits or currency lost during a gaming session reaches a designated amount; (7) a time of day reaches a designated time of day; (8) a length of a gaming session reaches a designated length; (9) the gaming system has not provided a play of a bonus game within a designated amount of time during a gaming session; (10) the gaming system has not provided a play of a bonus game within a designated quantity of plays of the game during a gaming session; (11) the player has achieved a designated quantity of consecutive winning outcomes during a gaming session; (12) the player has achieved a designated quantity of consecutive losing outcomes during a gaming session; (13) a total quantity of winning outcomes achieved during a gaming session reaches a designated quantity; (14) a total quantity of losing outcomes during a gaming session reaches a designated quantity; (15) a credit balance reaches a designated credit balance; (16) a total amount of currency deposited by the player during a gaming session reaches a designated amount; (17) frequency of play during a gaming session reaches a designated frequency; (18) the gaming system receives a designated ticket or coupon; or (19) a mystery trigger independent of the outcome of the play of the game occurs.

The modifier increase event is described above as being a random mystery event that occurs based on game play (e.g., based on the randomly-selected initial cards of a primary hand). In other embodiments, however, the modifier increase event is a mystery event that occurs independent of game play. In certain embodiments, the modifier increase event is one of the events described above with respect to the alternative modifier distribution events.

The persistent modifiers are, in other embodiments, other suitable types of modifiers instead of multipliers. For instance, in certain embodiments, the persistent modifiers are quantities of one or more wild elements added to the outcome of the associated outcome-generating element (e.g., at least one wild card added to the associated hand or at least one wild symbol added to the associated reel set) or to the outcome of the play of the game as a whole. In further embodiments, the persistent modifiers are outcome modification events for the associated outcome-generating element (e.g., a quantity of re-draws for the associated hand or a quantity of re-spins of one or more of the reels of the associated reel set). In various embodiments, the persistent modifiers are credit or cash values. In certain embodiments, an occurrence of a modifier type change event changes the type of persistent modifier (e.g., multiplier to additional wilds).

In certain embodiments, the gaming system automatically distributes a persistent modifier when that persistent modifier reaches the maximum value or a particular range of values. The gaming system does in the play of the game in which the persistent modifier reaches the maximum value or the particular range of values. For instance, if a multiplier increase event occurs during a play and the gaming system increases a persistent multiplier to 36×—the maximum value in this example embodiment—the gaming system distributes that 36× persistent multiplier in that particular play.

In various embodiments, the gaming system determines whether the modifier distribution event occurs after determining whether the modifier increase event occurs and increasing any persistent modifiers. Thus, depending on the embodiment, the gaming system determines whether the modifier increase event occurs before or after the gaming system determines whether the modifier distribution event occurs.

In certain embodiments, when the modifier distribution event occurs and a remainder exists, the gaming system enables the player to choose to which hand to add the remainder. In further embodiments, the gaming system accumulates the remainder into the overflow modifier bank.

In certain embodiments, upon the occurrence of the modifier distribution event, the gaming system enables the player to determine to which particular hands to distribute the persistent modifier. The player may select fewer than all hands.

In certain embodiments, if a distribute all event occurs, the gaming system provides all persistent modifiers. In other embodiments, the occurrence of a particular event causes the gaming system to enable the player to choose which persistent modifier the player desires the gaming system to distribute.

In various embodiments, the gaming system determines whether the modifier distribution event occurs based on the combined value of all persistent modifiers. The higher the combined value, the higher the likelihood of occurrence of the modifier distribution event. In these embodiments, when the modifier distribution event occurs, the gaming system randomly selects which persistent modifier to distribute.

In certain embodiments, the gaming system randomly determines whether the modifier distribution event occurs and, responsive to determining that the modifier distribution event occurs, randomly determines which persistent modifier to provide. The gaming system may make these random determinations based on one or more weighted tables.

The present disclosure contemplates that:

(a) the modifier distribution event;

(b) the modifier increase event(s);

(c) the distribution of a persistent modifier (d) the determination of which persistent modifier to distribute (e) the determination of which persistent modifier to increase; and/or (f) any other variables or determinations described herein may be: (1) predetermined; (2) randomly determined; (3) randomly determined based on one or more weighted percentages (such as according to a weighted table); (4) determined based on a generated symbol or symbol combination; (5) determined independent of a generated symbol or symbol combination; (6) determined based on a random determination by a central controller (described below); (7) determined independent of a random determination by the central controller; (8) determined based on a random determination at an EGM; (9) determined independent of a random determination at the EGM; (10) determined based on at least one play of at least one game; (11) determined independent of at least one play of at least one game; (12) determined based on a player's selection; (13) determined independent of a player's selection; (14) determined based on one or more side wagers placed; (15) determined independent of one or more side wagers placed; (16) determined based on the player's primary game wager or wager level; (17) determined independent of the player's primary game wager or wager level; (18) determined based on time (such as the time of day); (19) determined independent of time (such as the time of day); (20) determined based on an amount of coin-in accumulated in one or more pools; (21) determined independent of an amount of coin-in accumulated in one or more pools; (22) determined based on a status of the player (i.e., a player tracking status); (23) determined independent of a status of the player (i.e., a player tracking status); (24) determined based on one or more other determinations disclosed herein; (25) determined independent of any other determination disclosed herein; or (26) determined in any other suitable manner or based on or independent of any other suitable factor(s).

4. Gaming Systems

The above-described embodiments of the present disclosure may be implemented in accordance with or in conjunction with one or more of a variety of different types of gaming systems, such as, but not limited to, those described below.

The present disclosure contemplates a variety of different gaming systems each having one or more of a plurality of different features, attributes, or characteristics. A "gaming system" as used herein refers to various configurations of: (a) one or more central servers, central controllers, or remote hosts; (b) one or more electronic gaming machines such as those located on a casino floor; and/or (c) one or more personal gaming devices, such as desktop computers, laptop computers, tablet computers or computing devices, personal digital assistants, mobile phones, and other mobile computing devices.

Thus, in various embodiments, the gaming system of the present disclosure includes: (a) one or more electronic gaming machines in combination with one or more central servers, central controllers, or remote hosts; (b) one or more personal gaming devices in combination with one or more central servers, central controllers, or remote hosts; (c) one or more personal gaming devices in combination with one or more electronic gaming machines; (d) one or more personal gaming devices, one or more electronic gaming machines, and one or more central servers, central controllers, or remote hosts in combination with one another; (e) a single electronic gaming machine; (f) a plurality of electronic gaming machines in combination with one another; (g) a single personal gaming device; (h) a plurality of personal gaming devices in combination with one another; (i) a single central server, central controller, or remote host; and/or (j) a plurality of central servers, central controllers, or remote hosts in combination with one another.

For brevity and clarity and unless specifically stated otherwise, the term "EGM" is used herein to refer to an electronic gaming machine (such as a slot machine, a video poker machine, a video lottery terminal (VLT), a video keno machine, or a video bingo machine located on a casino floor). Additionally, for brevity and clarity and unless specifically stated otherwise, "EGM" as used herein represents one EGM or a plurality of EGMs, "personal computing device" as used herein represents one personal computing device or a plurality of personal computing devices, and "central server, central controller, or remote host" as used herein represents one central server, central controller, or remote host or a plurality of central servers, central controllers, or remote hosts.

Figure 3:
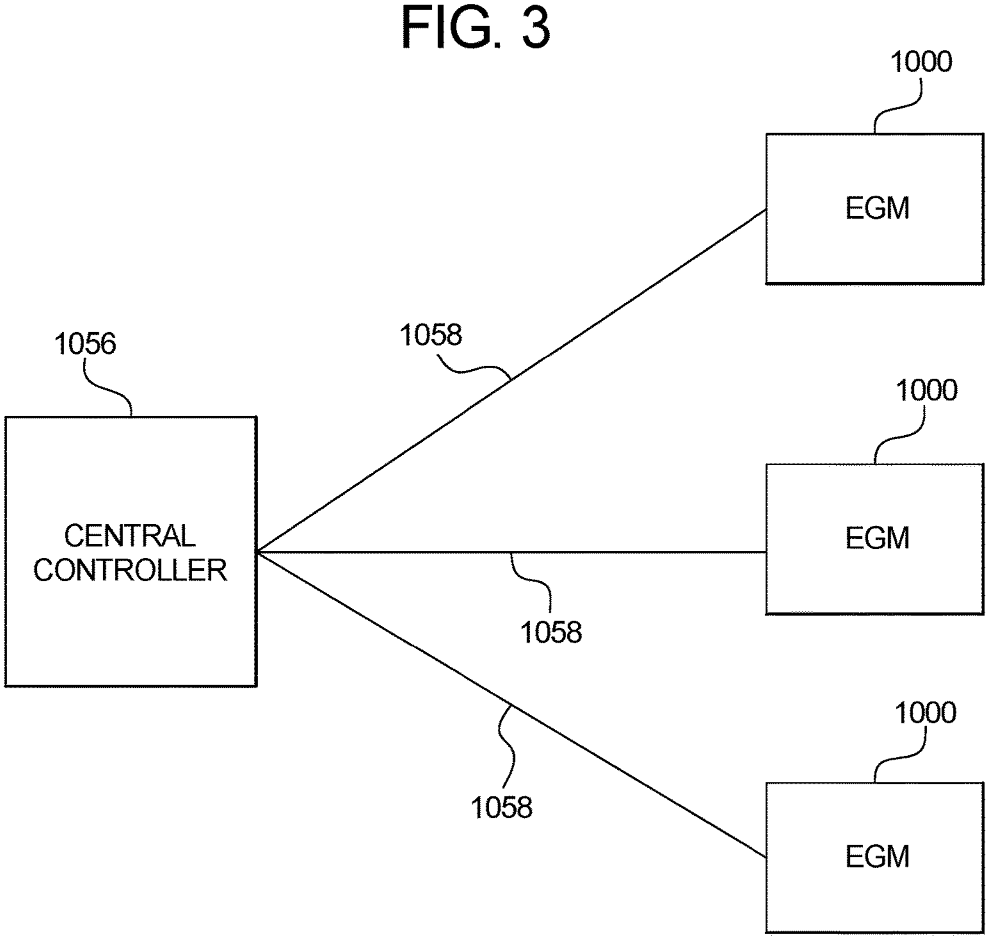
FIG. 3 is a schematic block diagram of one embodiment of a network configuration of the gaming system of the present disclosure.

As noted above, in various embodiments, the gaming system includes an EGM (or personal computing device) in combination with a central server, central controller, or remote host. In such embodiments, the EGM (or personal computing device) is configured to communicate with the central server, central controller, or remote host through a data network or remote communication link. In certain such embodiments, the EGM (or personal computing device) is configured to communicate with another EGM (or personal computing device) through the same data network or remote communication link or through a different data network or remote communication link. For example, the gaming system illustrated in FIG. 3 includes a plurality of EGMs 1000 that are each configured to communicate with a central server, central controller, or remote host 1056 through a data network 1058.

In certain embodiments in which the gaming system includes an EGM (or personal computing device) in combination with a central server, central controller, or remote host, the central server, central controller, or remote host is any suitable computing device (such as a server) that includes at least one processor and at least one memory device or data storage device. As further described herein, the EGM (or personal computing device) includes at least one EGM (or personal computing device) processor configured to transmit and receive data or signals representing events, messages, commands, or any other suitable information between the EGM (or personal computing device) and the central server, central controller, or remote host. The at least one processor of that EGM (or personal computing device) is configured to execute the events, messages, or commands represented by such data or signals in conjunction with the operation of the EGM (or personal computing device). Moreover, the at least one processor of the central server, central controller, or remote host is configured to transmit and receive data or signals representing events, messages, commands, or any other suitable information between the central server, central controller, or remote host and the EGM (or personal computing device). The at least one processor of the central server, central controller, or remote host is configured to execute the events, messages, or commands represented by such data or signals in conjunction with the operation of the central server, central controller, or remote host. One, more than one, or each of the functions of the central server, central controller, or remote host may be performed by the at least one processor of the EGM (or personal computing device). Further, one, more than one, or each of the functions of the at least one processor of the EGM (or personal computing device) may be performed by the at least one processor of the central server, central controller, or remote host.

In certain such embodiments, computerized instructions for controlling any games (such as any primary or base games and/or any secondary or bonus games) displayed by the EGM (or personal computing device) are executed by the central server, central controller, or remote host. In such "thin client" embodiments, the central server, central controller, or remote host remotely controls any games (or other suitable interfaces) displayed by the EGM (or personal computing device), and the EGM (or personal computing device) is utilized to display such games (or suitable interfaces) and to receive one or more inputs or commands. In other such embodiments, computerized instructions for controlling any games displayed by the EGM (or personal computing device) are communicated from the central server, central controller, or remote host to the EGM (or personal computing device) and are stored in at least one memory device of the EGM (or personal computing device). In such "thick client" embodiments, the at least one processor of the EGM (or personal computing device) executes the computerized instructions to control any games (or other suitable interfaces) displayed by the EGM (or personal computing device).

In various embodiments in which the gaming system includes a plurality of EGMs (or personal computing devices), one or more of the EGMs (or personal computing devices) are thin client EGMs (or personal computing devices) and one or more of the EGMs (or personal computing devices) are thick client EGMs (or personal computing devices). In other embodiments in which the gaming system includes one or more EGMs (or personal computing devices), certain functions of one or more of the EGMs (or personal computing devices) are implemented in a thin client environment, and certain other functions of one or more of the EGMs (or personal computing devices) are implemented in a thick client environment. In one such embodiment in which the gaming system includes an EGM (or personal computing device) and a central server, central controller, or remote host, computerized instructions for controlling any primary or base games displayed by the EGM (or personal computing device) are communicated from the central server, central controller, or remote host to the EGM (or personal computing device) in a thick client configuration, and computerized instructions for controlling any secondary or bonus games or other functions displayed by the EGM (or personal computing device) are executed by the central server, central controller, or remote host in a thin client configuration.

In certain embodiments in which the gaming system includes: (a) an EGM (or personal computing device) configured to communicate with a central server, central controller, or remote host through a data network; and/or (b) a plurality of EGMs (or personal computing devices) configured to communicate with one another through a data network, the data network is a local area network (LAN) in which the EGMs (or personal computing devices) are located substantially proximate to one another and/or the central server, central controller, or remote host. In one example, the EGMs (or personal computing devices) and the central server, central controller, or remote host are located in a gaming establishment or a portion of a gaming establishment.

In other embodiments in which the gaming system includes: (a) an EGM (or personal computing device) configured to communicate with a central server, central controller, or remote host through a data network; and/or (b) a plurality of EGMs (or personal computing devices) configured to communicate with one another through a data network, the data network is a wide area network (WAN) in which one or more of the EGMs (or personal computing devices) are not necessarily located substantially proximate to another one of the EGMs (or personal computing devices) and/or the central server, central controller, or remote host. For example, one or more of the EGMs (or personal computing devices) are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs (or personal computing devices) are located. In certain embodiments in which the data network is a WAN, the gaming system includes a central server, central controller, or remote host and an EGM (or personal computing device) each located in a different gaming establishment in a same geographic area, such as a same city or a same state. Gaming systems in which the data network is a WAN are substantially identical to gaming systems in which the data network is a LAN, though the quantity of EGMs (or personal computing devices) in such gaming systems may vary relative to one another.

In further embodiments in which the gaming system includes: (a) an EGM (or personal computing device) configured to communicate with a central server, central controller, or remote host through a data network; and/or (b) a plurality of EGMs (or personal computing devices) configured to communicate with one another through a data network, the data network is an internet (such as the Internet) or an intranet. In certain such embodiments, an Internet browser of the EGM (or personal computing device) is usable to access an Internet game page from any location where an Internet connection is available. In one such embodiment, after the EGM (or personal computing device) accesses the Internet game page, the central server, central controller, or remote host identifies a player prior to enabling that player to place any wagers on any plays of any wagering games. In one example, the central server, central controller, or remote host identifies the player by requiring a player account of the player to be logged into via an input of a unique username and password combination assigned to the player. The central server, central controller, or remote host may, however, identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the EGM (or personal computing device), such as by identifying the MAC address or the IP address of the Internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the Internet browser of the EGM (or personal computing device). Examples of implementations of Internet-based gaming are further described in U.S. Pat. No. 8,764,566, entitled "Internet Remote Game Server," and U.S. Pat. No. 8,147,334, entitled "Universal Game Server," which are incorporated herein by reference.

The central server, central controller, or remote host and the EGM (or personal computing device) are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile Internet network), or any other suitable medium. The expansion in the quantity of computing devices and the quantity and speed of Internet connections in recent years increases opportunities for players to use a variety of EGMs (or personal computing devices) to play games from an ever-increasing quantity of remote sites. Additionally, the enhanced bandwidth of digital wireless communications may render such technology suitable for some or all communications, particularly if such communications are encrypted. Higher data transmission speeds may be useful for enhancing the sophistication and response of the display and interaction with players.

5. EGM Components

Figure 4:
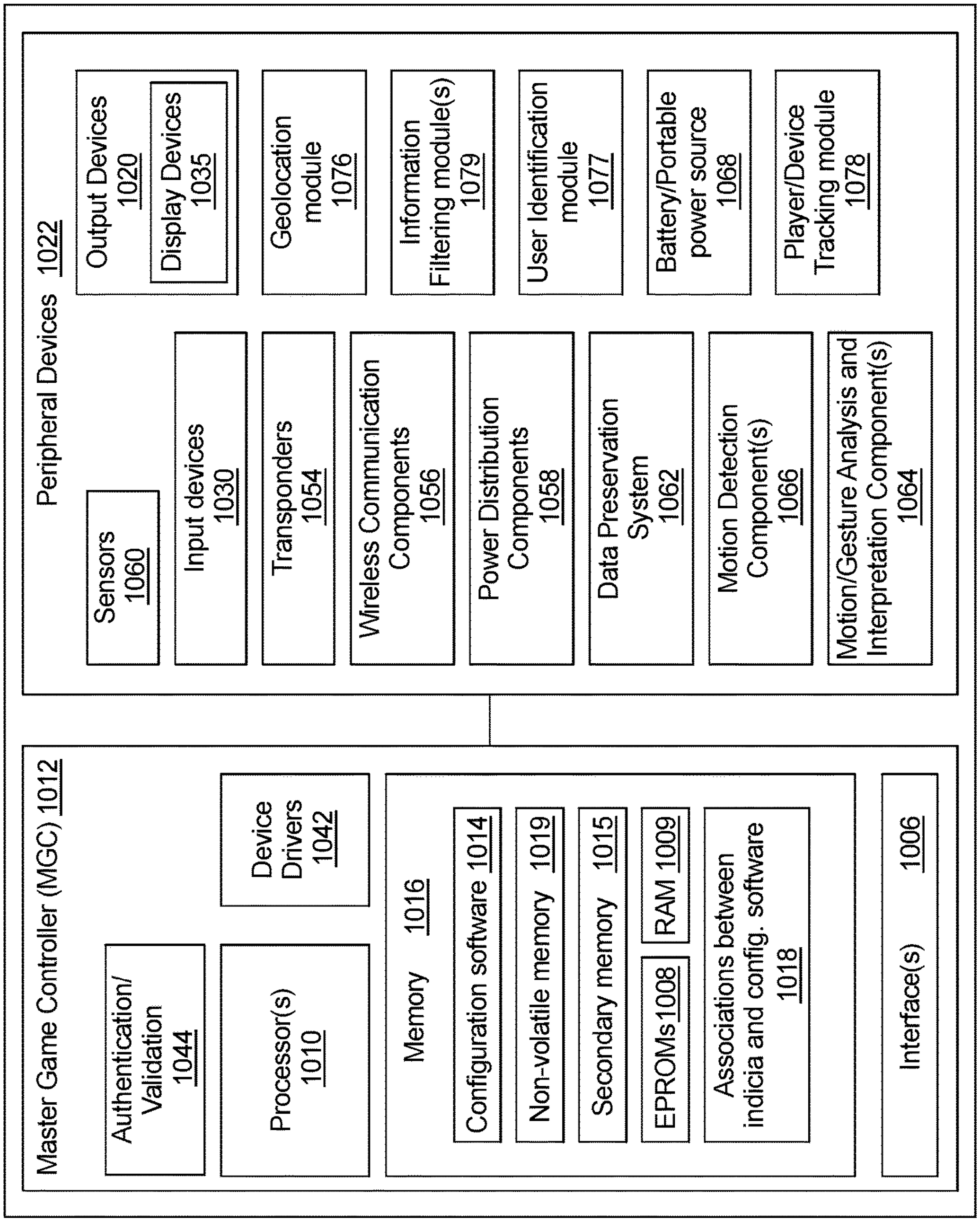
FIG. 4 is a schematic block diagram of an example electronic configuration of the gaming system of the present disclosure.
Figure 5A:
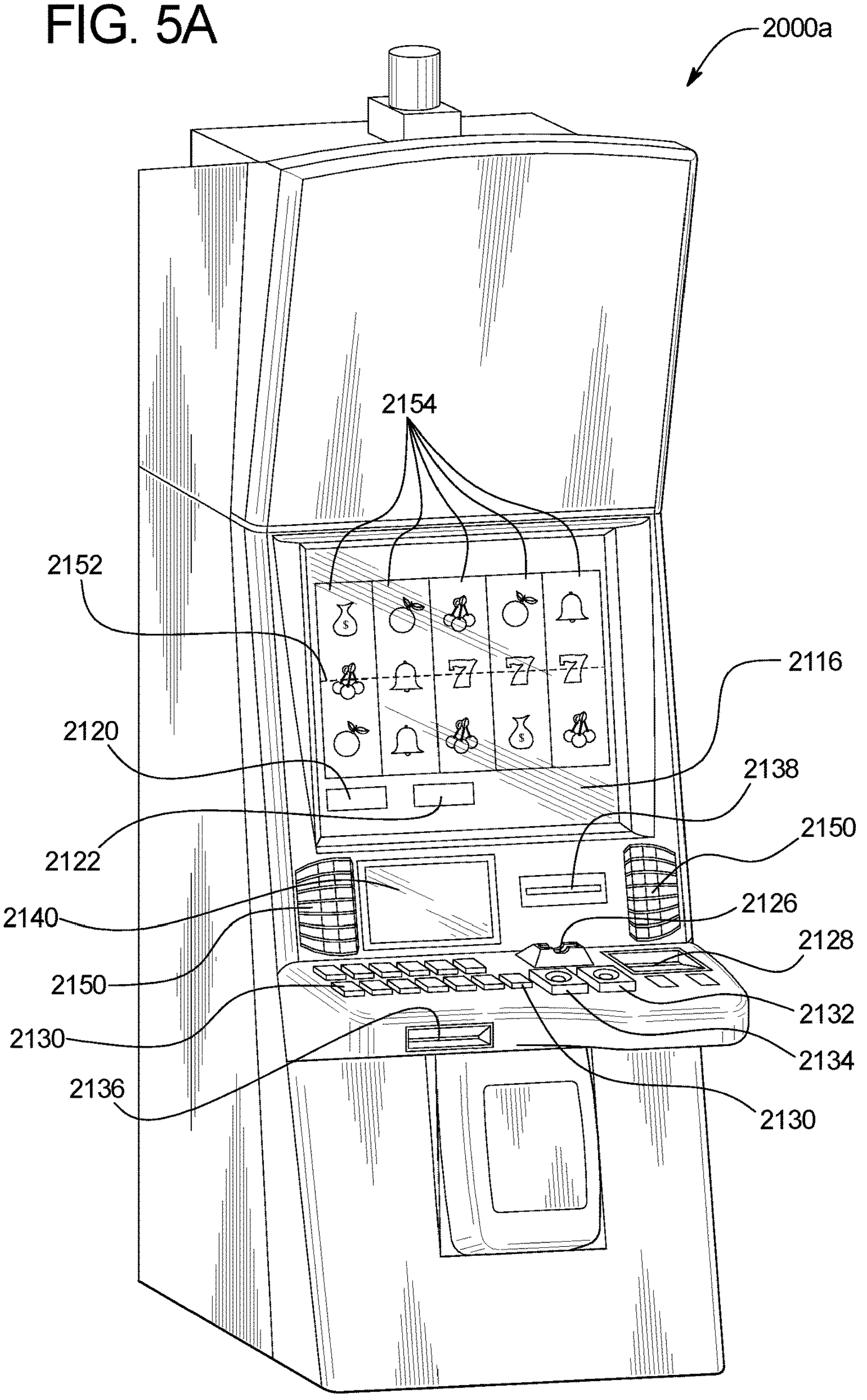
FIGS. 5A and 5B are perspective views of example alternative embodiments of the gaming system of the present disclosure.
Figure 5B:
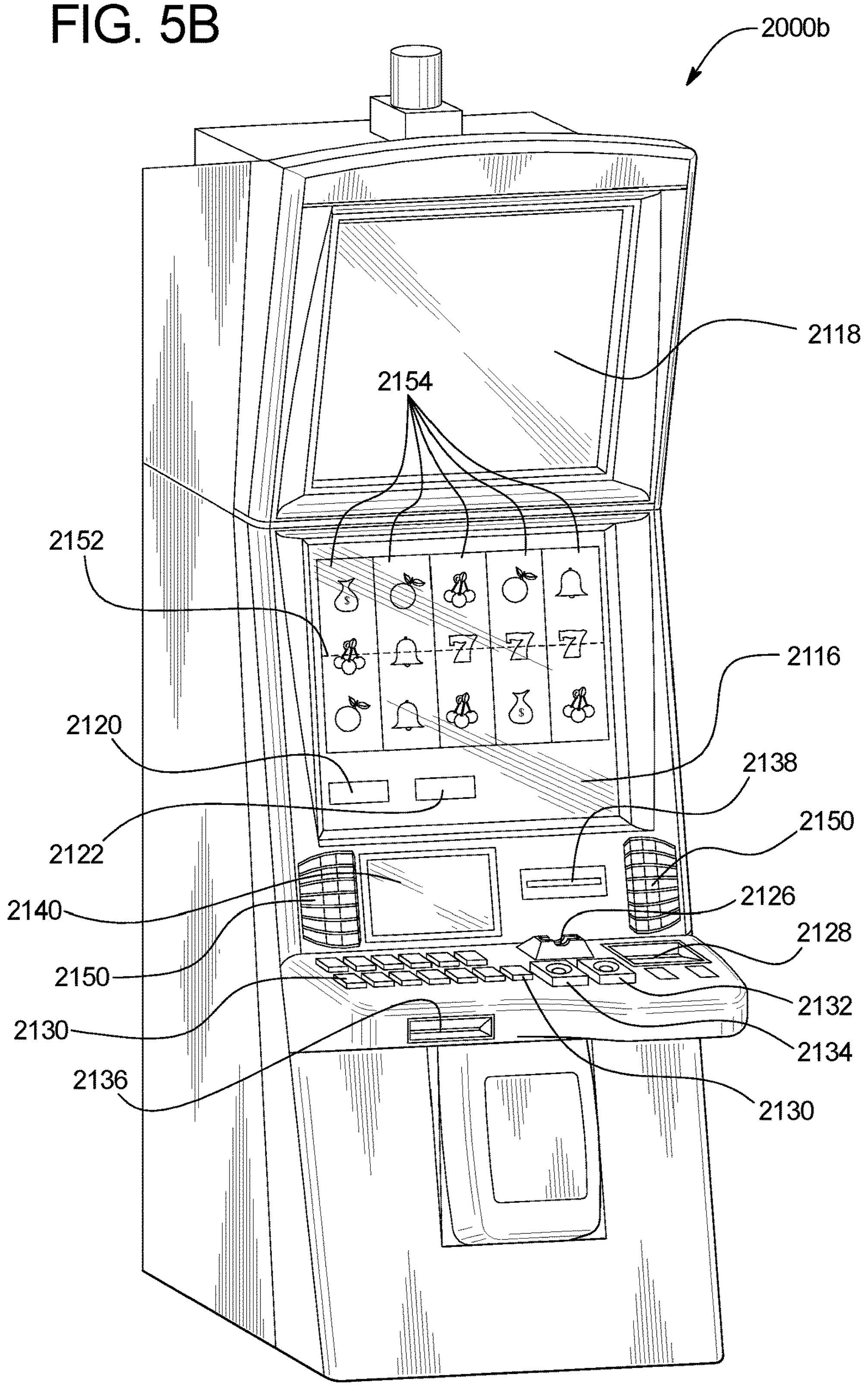

FIG. 4 is a block diagram of an example EGM 1000 and FIGS. 5A and 5B include two different example EGMs 2000*a* and 2000*b*. The EGMs 1000, 2000*a*, and 2000*b* are merely example EGMs, and different EGMs may be implemented using different combinations of the components shown in the EGMs 1000, 2000*a*, and 2000*b*.

In these embodiments, the EGM 1000 includes a master gaming controller 1012 configured to communicate with and to operate with a plurality of peripheral devices 1022.

The master gaming controller 1012 includes at least one processor 1010. The at least one processor 1010 is any suitable processing device or set of processing devices, such as a microprocessor, a microcontroller-based platform, a suitable integrated circuit, or one or more application-specific integrated circuits (ASICs), configured to execute software enabling various configuration and reconfiguration tasks, such as: (1) communicating with a remote source (such as a server that stores authentication information or game information) via a communication interface 1006 of the master gaming controller 1012; (2) converting signals read by an interface to a format corresponding to that used by software or memory of the EGM; (3) accessing memory to configure or reconfigure game parameters in the memory according to indicia read from the EGM; (4) communicating with interfaces and the peripheral devices 1022 (such as input/output devices); and/or (5) controlling the peripheral devices 1022. In certain embodiments, one or more components of the master gaming controller 1012 (such as the at least one processor 1010) reside within a housing of the EGM (described below), while in other embodiments at least one component of the master gaming controller 1012 resides outside of the housing of the EGM.

The master gaming controller 1012 also includes at least one memory device 1016, which includes: (1) volatile memory (e.g., RAM 1009, which can include non-volatile RAM, magnetic RAM, ferroelectric RAM, and any other suitable forms); (2) non-volatile memory 1019 (e.g., disk memory, FLASH memory, EPROMs, EEPROMs, memristor-based non-volatile solid-state memory, etc.); (3) unalterable memory (e.g., EPROMs 1008); (4) read-only memory; and/or (5) a secondary memory storage device 1015, such as a non-volatile memory device, configured to store gaming software related information (the gaming software related information and the memory may be used to store various audio files and games not currently being used and invoked in a configuration or reconfiguration). Any other suitable magnetic, optical, and/or semiconductor memory may operate in conjunction with the EGM disclosed herein. In certain embodiments, the at least one memory device 1016 resides within the housing of the EGM (described below), while in other embodiments at least one component of the at least one memory device 1016 resides outside of the housing of the EGM.

The at least one memory device 1016 is configured to store, for example: (1) configuration software 1014, such as all the parameters and settings for a game playable on the EGM; (2) associations 1018 between configuration indicia read from an EGM with one or more parameters and settings; (3) communication protocols configured to enable the at least one processor 1010 to communicate with the peripheral devices 1022; and/or (4) communication transport protocols (such as TCP/IP, USB, Firewire, IEEE1394, Bluetooth, IEEE 802.11x (IEEE 802.11 standards), hiperlan/2, HomeRF, etc.) configured to enable the EGM to communicate with local and non-local devices using such protocols. In one implementation, the master gaming controller 1012 communicates with other devices using a serial communication protocol. A few non-limiting examples of serial communication protocols that other devices, such as peripherals (e.g., a bill validator or a ticket printer), may use to communicate with the master game controller 1012 include USB, RS-232, and Netplex (a proprietary protocol developed by IGT).

In certain embodiments, the at least one memory device 1016 is configured to store program code and instructions executable by the at least one processor of the EGM to control the EGM. The at least one memory device 1016 of the EGM also stores other operating data, such as image data, event data, input data, random number generators (RNGs) or pseudo-RNGs, paytable data or information, and/or applicable game rules that relate to the play of one or more games on the EGM. In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a player uses such a removable memory device in an EGM to implement at least part of the present disclosure. In other embodiments, part or all of the program code and/or the operating data is downloaded to the at least one memory device of the EGM through any suitable data network described above (such as an Internet or intranet).

The at least one memory device 1016 also stores a plurality of device drivers 1042. Examples of different types of device drivers include device drivers for EGM components and device drivers for the peripheral components 1022. Typically, the device drivers 1042 utilize various communication protocols that enable communication with a particular physical device. The device driver abstracts the hardware implementation of that device. For example, a device driver may be written for each type of card reader that could potentially be connected to the EGM. Non-limiting examples of communication protocols used to implement the device drivers include Netplex, USB, Serial, Ethernet 175, Firewire, I/O debouncer, direct memory map, serial, PCI, parallel, RF, Bluetooth™, near-field communications (e.g., using near-field magnetics), 802.11 (WiFi), etc. In one embodiment, when one type of a particular device is exchanged for another type of the particular device, the at least one processor of the EGM loads the new device driver from the at least one memory device to enable communication with the new device. For instance, one type of card reader in the EGM can be replaced with a second different type of card reader when device drivers for both card readers are stored in the at least one memory device.

In certain embodiments, the software units stored in the at least one memory device 1016 can be upgraded as needed. For instance, when the at least one memory device 1016 is a hard drive, new games, new game options, new parameters, new settings for existing parameters, new settings for new parameters, new device drivers, and new communication protocols can be uploaded to the at least one memory device 1016 from the master game controller 1012 or from some other external device. As another example, when the at least one memory device 1016 includes a CD/DVD drive including a CD/DVD configured to store game options, parameters, and settings, the software stored in the at least one memory device 1016 can be upgraded by replacing a first CD/DVD with a second CD/DVD. In yet another example, when the at least one memory device 1016 uses flash memory 1019 or EPROM 1008 units configured to store games, game options, parameters, and settings, the software stored in the flash and/or EPROM memory units can be upgraded by replacing one or more memory units with new memory units that include the upgraded software. In another embodiment, one or more of the memory devices, such as the hard drive, may be employed in a game software download process from a remote software server.

In some embodiments, the at least one memory device 1016 also stores authentication and/or validation components 1044 configured to authenticate/validate specified EGM components and/or information, such as hardware components, software components, firmware components, peripheral device components, user input device components, information received from one or more user input devices, information stored in the at least one memory device 1016, etc. Examples of various authentication and/or validation components are described in U.S. Pat. No. 6,620,047, entitled "Electronic Gaming Apparatus Having Authentication Data Sets," which is incorporated herein by reference.

In certain embodiments, the peripheral devices 1022 include several device interfaces, such as: (1) at least one output device 1020 including at least one display device 1035; (2) at least one input device 1030 (which may include contact and/or non-contact interfaces); (3) at least one transponder 1054; (4) at least one wireless communication component 1056; (5) at least one wired/wireless power distribution component 1058; (6) at least one sensor 1060; (7) at least one data preservation component 1062; (8) at least one motion/gesture analysis and interpretation component 1064; (9) at least one motion detection component 1066; (10) at least one portable power source 1068; (11) at least one geolocation module 1076; (12) at least one user identification module 1077; (13) at least one player/device tracking module 1078; and (14) at least one information filtering module 1079.

The at least one output device 1020 includes at least one display device 1035 configured to display any game(s) displayed by the EGM and any suitable information associated with such game(s). In certain embodiments, the display devices are connected to or mounted on a housing of the EGM (described below). In various embodiments, the display devices serve as digital glass configured to advertise certain games or other aspects of the gaming establishment in which the EGM is located. In various embodiments, the EGM includes one or more of the following display devices: (a) a central display device; (b) a player tracking display configured to display various information regarding a player's player tracking status (as described below); (c) a secondary or upper display device in addition to the central display device and the player tracking display; (d) a credit display configured to display a current quantity of credits, amount of cash, account balance, or the equivalent; and (e) a bet display configured to display an amount wagered for one or more plays of one or more games. The example EGM 2000*a* illustrated in FIG. 5A includes a central display device 2116, a player tracking display 2140, a credit display 2120, and a bet display 2122. The example EGM 2000*b* illustrated in FIG. 5B includes a central display device 2116, an upper display device 2118, a player tracking display 2140, a credit display 2120, and a bet display 2122.

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. The display devices may be of any suitable sizes, shapes, and configurations.

The display devices of the EGM are configured to display one or more game and/or non-game images, symbols, and indicia. In certain embodiments, the display devices of the EGM are configured to display any suitable visual representation or exhibition of the movement of objects; dynamic lighting; video images; images of people, characters, places, things, and faces of cards; and the like. In certain embodiments, the display devices of the EGM are configured to display one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, the at least one output device 1020 includes a payout device. In these embodiments, after the EGM receives an actuation of a cashout device (described below), the EGM causes the payout device to provide a payment to the player. In one embodiment, the payout device is one or more of: (a) a ticket printer and dispenser configured to print and dispense a ticket or credit slip associated with a monetary value, wherein the ticket or credit slip may be redeemed for its monetary value via a cashier, a kiosk, or other suitable redemption system; (b) a bill dispenser configured to dispense paper currency; (c) a coin dispenser configured to dispense coins or tokens (such as into a coin payout tray); and (d) any suitable combination thereof. The example EGMs 2000*a* and 2000*b* illustrated in FIGS. 5A and 5B each include a ticket printer and dispenser 2136. Examples of ticket-in ticket-out (TITO) technology are described in U.S. Pat. No. 5,429,361, entitled "Gaming Machine Information, Communication and Display System"; U.S. Pat. No. 5,470,079, entitled "Gaming Machine Accounting and Monitoring System"; U.S. Pat. No. 5,265,874, entitled "Cashless Gaming Apparatus and Method"; U.S. Pat. No. 6,729,957, entitled "Gaming Method and Host Computer with Ticket-In/Ticket-Out Capability"; U.S. Pat. No. 6,729,958, entitled "Gaming System with Ticket-In/Ticket-Out Capability"; U.S. Pat. No. 6,736,725, entitled "Gaming Method and Host Computer with Ticket-In/Ticket- Out Capability"; U.S. Pat. No. 7,275,991, entitled "Slot Machine with Ticket-In/Ticket-Out Capability"; U.S. Pat. No. 6,048,269, entitled "Coinless Slot Machine System and Method"; and U.S. Pat. No. 5,290,003, entitled "Gaming Machine and Coupons," which are incorporated herein by reference.

In certain embodiments, rather than dispensing bills, coins, or a physical ticket having a monetary value to the player following receipt of an actuation of the cashout device, the payout device is configured to cause a payment to be provided to the player in the form of an electronic funds transfer, such as via a direct deposit into a bank account, a casino account, or a prepaid account of the player; via a transfer of funds onto an electronically recordable identification card or smart card of the player; or via sending a virtual ticket having a monetary value to an electronic device of the player. Examples of providing payment using virtual tickets are described in U.S. Pat. No. 8,613,659, entitled "Virtual Ticket-In and Ticket-Out on a Gaming Machine," which is incorporated herein by reference.

While any credit balances, any wagers, any values, and any awards are described herein as amounts of monetary credits or currency, one or more of such credit balances, such wagers, such values, and such awards may be for non-monetary credits, promotional credits, of player tracking points or credits.

In certain embodiments, the at least one output device 1020 is a sound generating device controlled by one or more sound cards. In one such embodiment, the sound generating device includes one or more speakers or other sound generating hardware and/or software configured to generate sounds, such as by playing music for any games or by playing music for other modes of the EGM, such as an attract mode. The example EGMs 2000*a* and 2000*b* illustrated in FIGS. 5A and 5B each include a plurality of speakers 2150. In another such embodiment, the EGM provides dynamic sounds coupled with attractive multimedia images displayed on one or more of the display devices to provide an audio-visual representation or to otherwise display full-motion video with sound to attract players to the EGM. In certain embodiments, the EGM displays a sequence of audio and/or visual attraction messages during idle periods to attract potential players to the EGM. The videos may be customized to provide any appropriate information.

The at least one input device 1030 may include any suitable device that enables an input signal to be produced and received by the at least one processor 1010 of the EGM.

In one embodiment, the at least one input device 1030 includes a payment device configured to communicate with the at least one processor of the EGM to fund the EGM. In certain embodiments, the payment device includes one or more of: (a) a bill acceptor into which paper money is inserted to fund the EGM; (b) a ticket acceptor into which a ticket or a voucher is inserted to fund the EGM; (c) a coin slot into which coins or tokens are inserted to fund the EGM; (d) a reader or a validator for credit cards, debit cards, or credit slips into which a credit card, debit card, or credit slip is inserted to fund the EGM; (e) a player identification card reader into which a player identification card is inserted to fund the EGM; or (f) any suitable combination thereof. The example EGMs 2000*a* and 2000*b* illustrated in FIGS. 5A and 5B each include a combined bill and ticket acceptor 2128 and a coin slot 2126.

In one embodiment, the at least one input device 1030 includes a payment device configured to enable the EGM to be funded via an electronic funds transfer, such as a transfer of funds from a bank account. In another embodiment, the EGM includes a payment device configured to communicate with a mobile device of a player, such as a mobile phone, a radio frequency identification tag, or any other suitable wired or wireless device, to retrieve relevant information associated with that player to fund the EGM. Examples of funding an EGM via communication between the EGM and a mobile device (such as a mobile phone) of a player are described in U.S. Patent Application Publication No. 2013/0344942, entitled "Avatar as Security Measure for Mobile Device Use with Electronic Gaming Machine," which is incorporated herein by reference. When the EGM is funded, the at least one processor determines the amount of funds entered and displays the corresponding amount on a credit display or any other suitable display as described below.

In certain embodiments, the at least one input device 1030 includes at least one wagering or betting device. In various embodiments, the one or more wagering or betting devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). One such wagering or betting device is as a maximum wager or bet device that, when actuated, causes the EGM to place a maximum wager on a play of a game. Another such wagering or betting device is a repeat bet device that, when actuated, causes the EGM to place a wager that is equal to the previously-placed wager on a play of a game. A further such wagering or betting device is a bet one device that, when actuated, causes the EGM to increase the wager by one credit. Generally, upon actuation of one of the wagering or betting devices, the quantity of credits displayed in a credit meter (described below) decreases by the amount of credits wagered, while the quantity of credits displayed in a bet display (described below) increases by the amount of credits wagered.

In various embodiments, the at least one input device 1030 includes at least one game play activation device. In various embodiments, the one or more game play initiation devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). After a player appropriately funds the EGM and places a wager, the EGM activates the game play activation device to enable the player to actuate the game play activation device to initiate a play of a game on the EGM (or another suitable sequence of events associated with the EGM). After the EGM receives an actuation of the game play activation device, the EGM initiates the play of the game. The example EGMs 2000*a* and 2000*b* illustrated in FIGS. 5A and 5B each include a game play activation device in the form of a game play initiation button 2132. In other embodiments, the EGM begins game play automatically upon appropriate funding rather than upon utilization of the game play activation device.

In other embodiments, the at least one input device 1030 includes a cashout device. In various embodiments, the cashout device is: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). When the EGM receives an actuation of the cashout device from a player and the player has a positive (i.e., greater-than-zero) credit balance, the EGM initiates a payout associated with the player's credit balance. The example EGMs 2000*a* and 2000*b* illustrated in FIGS. 5A and 5B each include a cashout device in the form of a cashout button 2134.

In various embodiments, the at least one input device 1030 includes a plurality of buttons that are programmable by the EGM operator to, when actuated, cause the EGM to perform particular functions. For instance, such buttons may be hard keys, programmable soft keys, or icons icon displayed on a display device of the EGM (described below) that are actuatable via a touch screen of the EGM (described below) or via use of a suitable input device of the EGM (such as a mouse or a joystick). The example EGMs 2000*a* and 2000*b* illustrated in FIGS. 5A and 5B each include a plurality of such buttons 2130.

In certain embodiments, the at least one input device 1030 includes a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the EGM by touching the touch screen at the appropriate locations.

In embodiments including a player tracking system, as further described below, the at least one input device 1030 includes a card reader in communication with the at least one processor of the EGM. The example EGMs 2000*a* and 2000*b* illustrated in FIGS. 5A and 5B each include a card reader 2138. The card reader is configured to read a player identification card inserted into the card reader.

The at least one wireless communication component 1056 includes one or more communication interfaces having different architectures and utilizing a variety of protocols, such as (but not limited to) 802.11 (WiFi); 802.15 (including Bluetooth™); 802.16 (WiMax); 802.22; cellular standards such as CDMA, CDMA2000, and WCDMA; Radio Frequency (e.g., RFID); infrared; and Near Field Magnetic communication protocols. The at least one wireless communication component 1056 transmits electrical, electromagnetic, or optical signals that carry digital data streams or analog signals representing various types of information.

The at least one wired/wireless power distribution component 1058 includes components or devices that are configured to provide power to other devices. For example, in one embodiment, the at least one power distribution component 1058 includes a magnetic induction system that is configured to provide wireless power to one or more user input devices near the EGM. In one embodiment, a user input device docking region is provided, and includes a power distribution component that is configured to recharge a user input device without requiring metal-to-metal contact. In one embodiment, the at least one power distribution component 1058 is configured to distribute power to one or more internal components of the EGM, such as one or more rechargeable power sources (e.g., rechargeable batteries) located at the EGM.

In certain embodiments, the at least one sensor 1060 includes at least one of: optical sensors, pressure sensors, RF sensors, infrared sensors, image sensors, thermal sensors, and biometric sensors. The at least one sensor 1060 may be used for a variety of functions, such as: detecting movements and/or gestures of various objects within a predetermined proximity to the EGM; detecting the presence and/or identity of various persons (e.g., players, casino employees, etc.), devices (e.g., user input devices), and/or systems within a predetermined proximity to the EGM.

The at least one data preservation component 1062 is configured to detect or sense one or more events and/or conditions that, for example, may result in damage to the EGM and/or that may result in loss of information associated with the EGM. Additionally, the data preservation system 1062 may be operable to initiate one or more appropriate action(s) in response to the detection of such events/conditions.

The at least one motion/gesture analysis and interpretation component 1064 is configured to analyze and/or interpret information relating to detected player movements and/or gestures to determine appropriate player input information relating to the detected player movements and/or gestures. For example, in one embodiment, the at least one motion/gesture analysis and interpretation component 1064 is configured to perform one or more of the following functions: analyze the detected gross motion or gestures of a player; interpret the player's motion or gestures (e.g., in the context of a casino game being played) to identify instructions or input from the player; utilize the interpreted instructions/input to advance the game state; etc. In other embodiments, at least a portion of these additional functions may be implemented at a remote system or device.

The at least one portable power source 1068 enables the EGM to operate in a mobile environment. For example, in one embodiment, the EGM 300 includes one or more rechargeable batteries.

The at least one geolocation module 1076 is configured to acquire geolocation information from one or more remote sources and use the acquired geolocation information to determine information relating to a relative and/or absolute position of the EGM. For example, in one implementation, the at least one geolocation module 1076 is configured to receive GPS signal information for use in determining the position or location of the EGM. In another implementation, the at least one geolocation module 1076 is configured to receive multiple wireless signals from multiple remote devices (e.g., EGMs, servers, wireless access points, etc.) and use the signal information to compute position/location information relating to the position or location of the EGM.

The at least one user identification module 1077 is configured to determine the identity of the current user or current owner of the EGM. For example, in one embodiment, the current user is required to perform a login process at the EGM in order to access one or more features. Alternatively, the EGM is configured to automatically determine the identity of the current user based on one or more external signals, such as an RFID tag or badge worn by the current user and that provides a wireless signal to the EGM that is used to determine the identity of the current user. In at least one embodiment, various security features are incorporated into the EGM to prevent unauthorized users from accessing confidential or sensitive information.

The at least one information filtering module 1079 is configured to perform filtering (e.g., based on specified criteria) of selected information to be displayed at one or more displays 1035 of the EGM.

In various embodiments, the EGM includes a plurality of communication ports configured to enable the at least one processor of the EGM to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices. U.S. Pat. No. 7,290,072 describes a variety of EGMs including one or more communication ports that enable the EGMs to communicate and operate with one or more external peripherals.

As generally described above, in certain embodiments, such as the example EGMs 2000*a* and 2000*b* illustrated in FIGS. 5A and 5B, the EGM has a support structure, housing, or cabinet that provides support for a plurality of the input devices and the output devices of the EGM. Further, the EGM is configured such that a player may operate it while standing or sitting. In various embodiments, the EGM is positioned on a base or stand, or is configured as a pub-style tabletop game (not shown) that a player may operate typically while sitting. As illustrated by the different example EGMs 2000*a* and 2000*b* shown in FIGS. 5A and 5B, EGMs may have varying housing and display configurations.

In certain embodiments, the EGM is a device that has obtained approval from a regulatory gaming commission, and in other embodiments, the EGM is a device that has not obtained approval from a regulatory gaming commission.

The EGMs described above are merely three examples of different types of EGMs. Certain of these example EGMs may include one or more elements that may not be included in all gaming systems, and these example EGMs may not include one or more elements that are included in other gaming systems. For example, certain EGMs include a coin acceptor while others do not.

6. Operation of Primary or Base Games and/or Secondary or Bonus Games

In various embodiments, an EGM may be implemented in one of a variety of different configurations. In various embodiments, the EGM may be implemented as one of: (a) a dedicated EGM in which computerized game programs executable by the EGM for controlling any primary or base games (referred to herein as "primary games") and/or any secondary or bonus games or other functions (referred to herein as "secondary games") displayed by the EGM are provided with the EGM prior to delivery to a gaming establishment or prior to being provided to a player; and (b) a changeable EGM in which computerized game programs executable by the EGM for controlling any primary games and/or secondary games displayed by the EGM are downloadable or otherwise transferred to the EGM through a data network or remote communication link; from a USB drive, flash memory card, or other suitable memory device; or in any other suitable manner after the EGM is physically located in a gaming establishment or after the EGM is provided to a player.

As generally explained above, in various embodiments in which the gaming system includes a central server, central controller, or remote host and a changeable EGM, the at least one memory device of the central server, central controller, or remote host stores different game programs and instructions executable by the at least one processor of the changeable EGM to control one or more primary games and/or secondary games displayed by the changeable EGM. More specifically, each such executable game program represents a different game or a different type of game that the at least one changeable EGM is configured to operate. In one example, certain of the game programs are executable by the changeable EGM to operate games having the same or substantially the same game play but different paytables. In different embodiments, each executable game program is associated with a primary game, a secondary game, or both. In certain embodiments, an executable game program is executable by the at least one processor of the at least one changeable EGM as a secondary game to be played simultaneously with a play of a primary game (which may be downloaded to or otherwise stored on the at least one changeable EGM), or vice versa.

In operation of such embodiments, the central server, central controller, or remote host is configured to communicate one or more of the stored executable game programs to the at least one processor of the changeable EGM. In different embodiments, a stored executable game program is communicated or delivered to the at least one processor of the changeable EGM by: (a) embedding the executable game program in a device or a component (such as a microchip to be inserted into the changeable EGM); (b) writing the executable game program onto a disc or other media; or (c) uploading or streaming the executable game program over a data network (such as a dedicated data network). After the executable game program is communicated from the central server, central controller, or remote host to the changeable EGM, the at least one processor of the changeable EGM executes the executable game program to enable the primary game and/or the secondary game associated with that executable game program to be played using the display device(s) and/or the input device(s) of the changeable EGM. That is, when an executable game program is communicated to the at least one processor of the changeable EGM, the at least one processor of the changeable EGM changes the game or the type of game that may be played using the changeable EGM.

In certain embodiments, the gaming system randomly determines any game outcome(s) (such as a win outcome) and/or award(s) (such as a quantity of credits to award for the win outcome) for a play of a primary game and/or a play of a secondary game based on probability data. In certain such embodiments, this random determination is provided through utilization of an RNG, such as a true RNG or a pseudo RNG, or any other suitable randomization process. In one such embodiment, each game outcome or award is associated with a probability, and the gaming system generates the game outcome(s) and/or the award(s) to be provided based on the associated probabilities. In these embodiments, since the gaming system generates game outcomes and/or awards randomly or based on one or more probability calculations, there is no certainty that the gaming system will ever provide any specific game outcome and/or award.

In certain embodiments, the gaming system maintains one or more predetermined pools or sets of predetermined game outcomes and/or awards. In certain such embodiments, upon generation or receipt of a game outcome and/or award request, the gaming system independently selects one of the predetermined game outcomes and/or awards from the one or more pools or sets. The gaming system flags or marks the selected game outcome and/or award as used. Once a game outcome or an award is flagged as used, it is prevented from further selection from its respective pool or set; that is, the gaming system does not select that game outcome or award upon another game outcome and/or award request. The gaming system provides the selected game outcome and/or award. Examples of this type of award evaluation are described in U.S. Pat. No. 7,470,183, entitled "Finite Pool Gaming Method and Apparatus"; U.S. Pat. No. 7,563,163, entitled "Gaming Device Including Outcome Pools for Providing Game Outcomes"; U.S. Pat. No. 7,833,092, entitled "Method and System for Compensating for Player Choice in a Game of Chance"; U.S. Pat. No. 8,070,579, entitled "Bingo System with Downloadable Common Patterns"; and U.S. Pat. No. 8,398,472, entitled "Central Determination Poker Game," which are incorporated herein by reference.

In certain embodiments, the gaming system determines a predetermined game outcome and/or award based on the results of a bingo, keno, or lottery game. In certain such embodiments, the gaming system utilizes one or more bingo, keno, or lottery games to determine the predetermined game outcome and/or award provided for a primary game and/or a secondary game. The gaming system is provided or associated with a bingo card. Each bingo card consists of a matrix or array of elements, wherein each element is designated with separate indicia. After a bingo card is provided, the gaming system randomly selects or draws a plurality of the elements. As each element is selected, a determination is made as to whether the selected element is present on the bingo card. If the selected element is present on the bingo card, that selected element on the provided bingo card is marked or flagged. This process of selecting elements and marking any selected elements on the provided bingo cards continues until one or more predetermined patterns are marked on one or more of the provided bingo cards. After one or more predetermined patterns are marked on one or more of the provided bingo cards, game outcome and/or award is determined based, at least in part, on the selected elements on the provided bingo cards. Examples of this type of award determination are described in U.S. Pat. No. 7,753,774, entitled "Using Multiple Bingo Cards to Represent Multiple Slot Paylines and Other Class III Game Options"; U.S. Pat. No. 7,731,581, entitled "Multi-Player Bingo Game with Multiple Alternative Outcome Displays"; U.S. Pat. No. 7,955,170, entitled "Providing Non-Bingo Outcomes for a Bingo Game"; U.S. Pat. No. 8,070,579, entitled "Bingo System with Downloadable Common Patterns"; and U.S. Pat. No. 8,500,538, entitled "Bingo Gaming System and Method for Providing Multiple Outcomes from Single Bingo Pattern," which are incorporated herein by reference.

In certain embodiments in which the gaming system includes a central server, central controller, or remote host and an EGM, the EGM is configured to communicate with the central server, central controller, or remote host for monitoring purposes only. In such embodiments, the EGM determines the game outcome(s) and/or award(s) to be provided in any of the manners described above, and the central server, central controller, or remote host monitors the activities and events occurring on the EGM. In one such embodiment, the gaming system includes a real-time or online accounting and gaming information system configured to communicate with the central server, central controller, or remote host. In this embodiment, the accounting and gaming information system includes: (a) a player database configured to store player profiles, (b) a player tracking module configured to track players (as described below), and (c) a credit system configured to provide automated transactions. Examples of such accounting systems are described in U.S. Pat. No. 6,913,534, entitled "Gaming Machine Having a Lottery Game and Capability for Integration with Gaming Device Accounting System and Player Tracking System," and U.S. Pat. No. 8,597,116, entitled "Virtual Player Tracking and Related Services," which are incorporated herein by reference.

As noted above, in various embodiments, the gaming system includes one or more executable game programs executable by at least one processor of the gaming system to provide one or more primary games and one or more secondary games. The primary game(s) and the secondary game(s) may comprise any suitable games and/or wagering games, such as, but not limited to: electro-mechanical or video slot or spinning reel type games; video card games such as video draw poker, multi-hand video draw poker, other video poker games, video blackjack games, and video baccarat games; video keno games; video bingo games; and video selection games.

In certain embodiments in which the primary game is a slot or spinning reel type game, the gaming system includes one or more reels in either an electromechanical form with mechanical rotating reels or in a video form with simulated reels and movement thereof. Each reel displays a plurality of indicia or symbols, such as bells, hearts, fruits, numbers, letters, bars, or other images that typically correspond to a theme associated with the gaming system. In certain such embodiments, the gaming system includes one or more paylines associated with the reels. The example EGM **2000*b* shown in FIG. 5B includes a payline 1152 and a plurality of reels 1154**. In certain embodiments, one or more of the reels are independent reels or unisymbol reels. In such embodiments, each independent reel generates and displays one symbol.

In various embodiments, one or more of the paylines is horizontal, vertical, circular, diagonal, angled, or any suitable combination thereof. In other embodiments, each of one or more of the paylines is associated with a plurality of adjacent symbol display areas on a requisite number of adjacent reels. In one such embodiment, one or more paylines are formed between at least two symbol display areas that are adjacent to each other by either sharing a common side or sharing a common corner (i.e., such paylines are connected paylines). The gaming system enables a wager to be placed on one or more of such paylines to activate such paylines. In other embodiments in which one or more paylines are formed between at least two adjacent symbol display areas, the gaming system enables a wager to be placed on a plurality of symbol display areas, which activates those symbol display areas.

In various embodiments, the gaming system provides one or more awards after a spin of the reels when specified types and/or configurations of the indicia or symbols on the reels occur on an active payline or otherwise occur in a winning pattern, occur on the requisite number of adjacent reels, and/or occur in a scatter pay arrangement.

In certain embodiments, the gaming system employs a ways to win award determination. In these embodiments, any outcome to be provided is determined based on a number of associated symbols that are generated in active symbol display areas on the requisite number of adjacent reels (i.e., not on paylines passing through any displayed winning symbol combinations). If a winning symbol combination is generated on the reels, one award for that occurrence of the generated winning symbol combination is provided. Examples of ways to win award determinations are described in U.S. Pat. No. 8,012,011, entitled "Gaming Device and Method Having Independent Reels and Multiple Ways of Winning"; U.S. Pat. No. 8,241,104, entitled "Gaming Device and Method Having Designated Rules for Determining Ways To Win"; and U.S. Pat. No. 8,430,739, entitled "Gaming System and Method Having Wager Dependent Different Symbol Evaluations," which are incorporated herein by reference.

In various embodiments, the gaming system includes a progressive award. Typically, a progressive award includes an initial amount and an additional amount funded through a portion of each wager placed to initiate a play of a primary game. When one or more triggering events occurs, the gaming system provides at least a portion of the progressive award. After the gaming system provides the progressive award, an amount of the progressive award is reset to the initial amount and a portion of each subsequent wager is allocated to the next progressive award. Examples of progressive gaming systems are described in U.S. Pat. No. 7,585,223, entitled “Server Based Gaming System Having Multiple Progressive Awards”; U.S. Pat. No. 7,651,392, entitled “Gaming Device System Having Partial Progressive Payout”; U.S. Pat. No. 7,666,093, entitled “Gaming Method and Device Involving Progressive Wagers”; U.S. Pat. No. 7,780,523, entitled “Server Based Gaming System Having Multiple Progressive Awards”; and U.S. Pat. No. 8,337,298, entitled “Gaming Device Having Multiple Different Types of Progressive Awards,” which are incorporated herein by reference.

As generally noted above, in addition to providing winning credits or other awards for one or more plays of the primary game(s), in various embodiments the gaming system provides credits or other awards for one or more plays of one or more secondary games. The secondary game typically enables an award to be obtained addition to any award obtained through play of the primary game(s). The secondary game(s) typically produces a higher level of player excitement than the primary game(s) because the secondary game(s) provides a greater expectation of winning than the primary game(s) and is accompanied with more attractive or unusual features than the primary game(s). The secondary game(s) may be any type of suitable game, either similar to or completely different from the primary game.

In various embodiments, the gaming system automatically provides or initiates the secondary game upon the occurrence of a triggering event or the satisfaction of a qualifying condition. In other embodiments, the gaming system initiates the secondary game upon the occurrence of the triggering event or the satisfaction of the qualifying condition and upon receipt of an initiation input. In certain embodiments, the triggering event or qualifying condition is a selected outcome in the primary game(s) or a particular arrangement of one or more indicia on a display device for a play of the primary game(s), such as a “BONUS” symbol appearing on three adjacent reels along a payline following a spin of the reels for a play of the primary game. In other embodiments, the triggering event or qualifying condition occurs based on a certain amount of game play (such as number of games, number of credits, amount of time) being exceeded, or based on a specified number of points being earned during game play. Any suitable triggering event or qualifying condition or any suitable combination of a plurality of different triggering events or qualifying conditions may be employed.

In other embodiments, at least one processor of the gaming system randomly determines when to provide one or more plays of one or more secondary games. In one such embodiment, no apparent reason is provided for providing the secondary game. In this embodiment, qualifying for a secondary game is not triggered by the occurrence of an event in any primary game or based specifically on any of the plays of any primary game. That is, qualification is provided without any explanation or, alternatively, with a simple explanation. In another such embodiment, the gaming system determines qualification for a secondary game at least partially based on a game triggered or symbol triggered event, such as at least partially based on play of a primary game.

In various embodiments, after qualification for a secondary game has been determined, the secondary game participation may be enhanced through continued play on the primary game. Thus, in certain embodiments, for each secondary game qualifying event, such as a secondary game symbol, that is obtained, a given number of secondary game wagering points or credits is accumulated in a “secondary game meter” configured to accrue the secondary game wagering credits or entries toward eventual participation in the secondary game. In one such embodiment, the occurrence of multiple such secondary game qualifying events in the primary game results in an arithmetic or exponential increase in the number of secondary game wagering credits awarded. In another such embodiment, any extra secondary game wagering credits may be redeemed during the secondary game to extend play of the secondary game.

In certain embodiments, no separate entry fee or buy-in for the secondary game is required. That is, entry into the secondary game cannot be purchased; rather, in these embodiments entry must be won or earned through play of the primary game, thereby encouraging play of the primary game. In other embodiments, qualification for the secondary game is accomplished through a simple “buy-in.” For example, qualification through other specified activities is unsuccessful, payment of a fee or placement of an additional wager “buys-in” to the secondary game. In certain embodiments, a separate side wager must be placed on the secondary game or a wager of a designated amount must be placed on the primary game to enable qualification for the secondary game. In these embodiments, the secondary game triggering event must occur and the side wager (or designated primary game wager amount) must have been placed for the secondary game to trigger.

In various embodiments in which the gaming system includes a plurality of EGMs, the EGMs are configured to communicate with one another to provide a group gaming environment. In certain such embodiments, the EGMs enable players of those EGMs to work in conjunction with one another, such as by enabling the players to play together as a team or group, to win one or more awards. In other such embodiments, the EGMs enable players of those EGMs to compete against one another for one or more awards. In one such embodiment, the EGMs enable the players of those EGMs to participate in one or more gaming tournaments for one or more awards. Examples of group gaming systems are described in U.S. Pat. No. 8,070,583, entitled “Server Based Gaming System and Method for Selectively Providing One or More Different Tournaments”; U.S. Pat. No. 8,500,548, entitled “Gaming System and Method for Providing Team Progressive Awards”; and U.S. Pat. No. 8,562,423, entitled “Method and Apparatus for Rewarding Multiple Game Players for a Single Win,” which are incorporated herein by reference.

In various embodiments, the gaming system includes one or more player tracking systems. Such player tracking systems enable operators of the gaming system (such as casinos or other gaming establishments) to recognize the value of customer loyalty by identifying frequent customers and rewarding them for their patronage. Such a player tracking system is configured to track a player’s gaming activity. In one such embodiment, the player tracking system does so through the use of player tracking cards. In this embodiment, a player is issued a player identification card that has an encoded player identification number that uniquely identifies the player. When the player’s playing tracking card is inserted into a card reader of the gaming system to begin a gaming session, the card reader reads the player identification number off the player tracking card to identify the player. The gaming system timely tracks any suitable information or data relating to the identified player's gaming session. The gaming system also timely tracks when the player tracking card is removed to conclude play for that gaming session. In another embodiment, rather than requiring insertion of a player tracking card into the card reader, the gaming system utilizes one or more portable devices, such as a mobile phone, a radio frequency identification tag, or any other suitable wireless device, to track when a gaming session begins and ends. In another embodiment, the gaming system utilizes any suitable biometric technology or ticket technology to track when a gaming session begins and ends.

In such embodiments, during one or more gaming sessions, the gaming system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the central display device and/or the upper display device. Examples of player tracking systems are described in U.S. Pat. No. 6,722,985, entitled "Universal Player Tracking System"; U.S. Pat. No. 6,908,387, entitled "Player Tracking Communication Mechanisms in a Gaming Machine"; U.S. Pat. No. 7,311,605, entitled "Player Tracking Assembly for Complete Patron Tracking for Both Gaming and Non-Gaming Casino Activity"; U.S. Pat. No. 7,611,411, entitled "Player Tracking Instruments Having Multiple Communication Modes"; U.S. Pat. No. 7,617,151, entitled "Alternative Player Tracking Techniques"; and U.S. Pat. No. 8,057,298, entitled "Virtual Player Tracking and Related Services," which are incorporated herein by reference.

7. Differentiating Certain Gaming Systems from General Purpose Computing Devices Certain of the gaming systems described herein, such as EGMs located in a casino or another gaming establishment, include certain components and/or are configured to operate in certain manners that differentiate these systems from general purpose computing devices, i.e., certain personal gaming devices such as desktop computers and laptop computers.

For instance, EGMs are highly regulated to ensure fairness and, in many cases, EGMs are configured to award monetary awards up to multiple millions of dollars. To satisfy security and regulatory requirements in a gaming environment, hardware and/or software architectures are implemented in EGMs that differ significantly from those of general purpose computing devices. For purposes of illustration, a description of EGMs relative to general purpose computing devices and some examples of these additional (or different) hardware and/or software architectures found in EGMs are described below.

At first glance, one might think that adapting general purpose computing device technologies to the gaming industry and EGMs would be a simple proposition because both general purpose computing devices and EGMs employ processors that control a variety of devices. However, due to at least: (1) the regulatory requirements placed on EGMs, (2) the harsh environment in which EGMs operate, (3) security requirements, and (4) fault tolerance requirements, adapting general purpose computing device technologies to EGMs can be quite difficult. Further, techniques and methods for solving a problem in the general purpose computing device industry, such as device compatibility and connectivity issues, might not be adequate in the gaming industry. For instance, a fault or a weakness tolerated in a general purpose computing device, such as security holes in software or frequent crashes, is not tolerated in an EGM because in an EGM these faults can lead to a direct loss of funds from the EGM, such as stolen cash or loss of revenue when the EGM is not operating properly or when the random outcome determination is manipulated.

Certain differences between general purpose computing devices and EGMs are described below. A first difference between EGMs and general purpose computing devices is that EGMs are state-based systems. A state-based system stores and maintains its current state in a non-volatile memory such that, in the event of a power failure or other malfunction, the state-based system can return to that state when the power is restored or the malfunction is remedied. For instance, for a state-based EGM, if the EGM displays an award for a game of chance but the power to the EGM fails before the EGM provides the award to the player, the EGM stores the pre-power failure state in a non-volatile memory, returns to that state upon restoration of power, and provides the award to the player. This requirement affects the software and hardware design on EGMs. General purpose computing devices are not state-based machines, and a majority of data is usually lost when a malfunction occurs on a general purpose computing device.

A second difference between EGMs and general purpose computing devices is that, for regulatory purposes, the software on the EGM utilized to operate the EGM has been designed to be static and monolithic to prevent cheating by the operator of the EGM. For instance, one solution that has been employed in the gaming industry to prevent cheating and to satisfy regulatory requirements has been to manufacture an EGM that can use a proprietary processor running instructions to provide the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used to operate a device during generation of the game of chance, can require burning a new EPROM approved by the gaming jurisdiction and reinstalling the new EPROM on the EGM in the presence of a gaming regulator. Regardless of whether the EPROM solution is used, to gain approval in most gaming jurisdictions, an EGM must demonstrate sufficient safeguards that prevent an operator or a player of an EGM from manipulating the EGM's hardware and software in a manner that gives him an unfair, and in some cases illegal, advantage.

A third difference between EGMs and general purpose computing devices is authentication—EGMs storing code are configured to authenticate the code to determine if the code is unaltered before executing the code. If the code has been altered, the EGM prevents the code from being executed. The code authentication requirements in the gaming industry affect both hardware and software designs on EGMs. Certain EGMs use hash functions to authenticate code. For instance, one EGM stores game program code, a hash function, and an authentication hash (which may be encrypted). Before executing the game program code, the EGM hashes the game program code using the hash function to obtain a result hash and compares the result hash to the authentication hash. If the result hash matches the authentication hash, the EGM determines that the game program code is valid and executes the game program code. If the result hash does not match the authentication hash, the EGM determines that the game program code has been altered (i.e., may have been tampered with) and prevents execution of the game program code. Examples of EGM code authentication are described in U.S. Pat. No. 6,962,530, entitled "Authentication in a Secure Computerized Gaming System"; U.S. Pat. No. 7,043,641, entitled "Encryption in a Secure Computerized Gaming System"; U.S. Pat. No. 7,201,662, entitled "Method and Apparatus for Software Authentication"; and U.S. Pat. No. 8,627,097, entitled "System and Method Enabling Parallel Processing of Hash Functions Using Authentication Checkpoint Hashes," which are incorporated herein by reference.

A fourth difference between EGMs and general purpose computing devices is that EGMs have unique peripheral device requirements that differ from those of a general purpose computing device, such as peripheral device security requirements not usually addressed by general purpose computing devices. For instance, monetary devices, such as coin dispensers, bill validators, and ticket printers and computing devices that are used to govern the input and output of cash or other items having monetary value (such as tickets) to and from an EGM have security requirements that are not typically addressed in general purpose computing devices. Therefore, many general purpose computing device techniques and methods developed to facilitate device connectivity and device compatibility do not address the emphasis placed on security in the gaming industry.

To address some of the issues described above, a number of hardware/software components and architectures are utilized in EGMs that are not typically found in general purpose computing devices. These hardware/software components and architectures, as described below in more detail, include but are not limited to watchdog timers, voltage monitoring systems, state-based software architecture and supporting hardware, specialized communication interfaces, security monitoring, and trusted memory.

Certain EGMs use a watchdog timer to provide a software failure detection mechanism. In a normally-operating EGM, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits include a loadable timeout counter register to enable the operating software to set the timeout interval within a certain range of time. A differentiating feature of some circuits is that the operating software cannot completely disable the function of the watchdog timer. In other words, the watchdog timer always functions from the time power is applied to the board.

Certain EGMs use several power supply voltages to operate portions of the computer circuitry. These can be generated in a central power supply or locally on the computer board. If any of these voltages falls out of the tolerance limits of the circuitry they power, unpredictable operation of the EGM may result. Though most modern general purpose computing devices include voltage monitoring circuitry, these types of circuits only report voltage status to the operating software. Out of tolerance voltages can cause software malfunction, creating a potential uncontrolled condition in the general purpose computing device. Certain EGMs have power supplies with relatively tighter voltage margins than that required by the operating circuitry. In addition, the voltage monitoring circuitry implemented in certain EGMs typically has two thresholds of control. The first threshold generates a software event that can be detected by the operating software and an error condition then generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the EGM.

As described above, certain EGMs are state-based machines. Different functions of the game provided by the EGM (e.g., bet, play, result, points in the graphical presentation, etc.) may be defined as a state. When the EGM moves a game from one state to another, the EGM stores critical data regarding the game software in a custom non-volatile memory subsystem. This ensures that the player's wager and credits are preserved and to minimize potential disputes in the event of a malfunction on the EGM. In general, the EGM does not advance from a first state to a second state until critical information that enables the first state to be reconstructed has been stored. This feature enables the EGM to recover operation to the current state of play in the event of a malfunction, loss of power, etc. that occurred just prior to the malfunction. In at least one embodiment, the EGM is configured to store such critical information using atomic transactions.

Generally, an atomic operation in computer science refers to a set of operations that can be combined so that they appear to the rest of the system to be a single operation with only two possible outcomes: success or failure. As related to data storage, an atomic transaction may be characterized as series of database operations which either all occur, or all do not occur. A guarantee of atomicity prevents updates to the database occurring only partially, which can result in data corruption.

To ensure the success of atomic transactions relating to critical information to be stored in the EGM memory before a failure event (e.g., malfunction, loss of power, etc.), memory that includes one or more of the following criteria be used: direct memory access capability; data read/write capability which meets or exceeds minimum read/write access characteristics (such as at least 5.08 Mbytes/sec (Read) and/or at least 38.0 Mbytes/sec (Write)). Memory devices that meet or exceed the above criteria may be referred to as "fault-tolerant" memory devices.

Typically, battery-backed RAM devices may be configured to function as fault-tolerant devices according to the above criteria, whereas flash RAM and/or disk drive memory are typically not configurable to function as fault-tolerant devices according to the above criteria. Accordingly, battery-backed RAM devices are typically used to preserve EGM critical data, although other types of non-volatile memory devices may be employed. These memory devices are typically not used in typical general purpose computing devices.

Thus, in at least one embodiment, the EGM is configured to store critical information in fault-tolerant memory (e.g., battery-backed RAM devices) using atomic transactions. Further, in at least one embodiment, the fault-tolerant memory is able to successfully complete all desired atomic transactions (e.g., relating to the storage of EGM critical information) within a time period of 200 milliseconds or less. In at least one embodiment, the time period of 200 milliseconds represents a maximum amount of time for which sufficient power may be available to the various EGM components after a power outage event has occurred at the EGM.

As described previously, the EGM may not advance from a first state to a second state until critical information that enables the first state to be reconstructed has been atomically stored. After the state of the EGM is restored during the play of a game of chance, game play may resume and the game may be completed in a manner that is no different than if the malfunction had not occurred. Thus, for example, when a malfunction occurs during a game of chance, the EGM may be restored to a state in the game of chance just prior to when the malfunction occurred. The restored state may include metering information and graphical information that was displayed on the EGM in the state prior to the malfunction. For example, when the malfunction occurs during the play of a card game after the cards have been dealt, the EGM may be restored with the cards that were previously displayed as part of the card game. As another example, a bonus game may be triggered during the play of a game of chance in which a player is required to make a number of selections on a video display screen. When a malfunction has occurred after the player has made one or more selections, the EGM may be restored to a state that shows the graphical presentation just prior to the malfunction including an indication of selections that have already been made by the player. In general, the EGM may be restored to any state in a plurality of states that occur in the game of chance that occurs while the game of chance is played or to states that occur between the play of a game of chance.

Game history information regarding previous games played such as an amount wagered, the outcome of the game, and the like may also be stored in a non-volatile memory device. The information stored in the non-volatile memory may be detailed enough to reconstruct a portion of the graphical presentation that was previously presented on the EGM and the state of the EGM (e.g., credits) at the time the game of chance was played. The game history information may be utilized in the event of a dispute. For example, a player may decide that in a previous game of chance that they did not receive credit for an award that they believed they won. The game history information may be used to reconstruct the state of the EGM prior to, during, and/or after the disputed game to demonstrate whether the player was correct or not in her assertion. Examples of a state-based EGM, recovery from malfunctions, and game history are described in U.S. Pat. No. 6,804,763, entitled "High Performance Battery Backed RAM Interface"; U.S. Pat. No. 6,863,608, entitled "Frame Capture of Actual Game Play"; U.S. Pat. No. 7,111,141, entitled "Dynamic NV-RAM"; and U.S. Pat. No. 7,384,339, entitled, "Frame Capture of Actual Game Play," which are incorporated herein by reference.

Another feature of EGMs is that they often include unique interfaces, including serial interfaces, to connect to specific subsystems internal and external to the EGM. The serial devices may have electrical interface requirements that differ from the "standard" EIA serial interfaces provided by general purpose computing devices. These interfaces may include, for example, Fiber Optic Serial, optically coupled serial interfaces, current loop style serial interfaces, etc. In addition, to conserve serial interfaces internally in the EGM, serial devices may be connected in a shared, daisy-chain fashion in which multiple peripheral devices are connected to a single serial channel.

The serial interfaces may be used to transmit information using communication protocols that are unique to the gaming industry. For example, IGT's Netplex is a proprietary communication protocol used for serial communication between EGMs. As another example, SAS is a communication protocol used to transmit information, such as metering information, from an EGM to a remote device. Often SAS is used in conjunction with a player tracking system.

Certain EGMs may alternatively be treated as peripheral devices to a casino communication controller and connected in a shared daisy chain fashion to a single serial interface. In both cases, the peripheral devices are assigned device addresses. If so, the serial controller circuitry must implement a method to generate or detect unique device addresses. General purpose computing device serial ports are not able to do this.

Security monitoring circuits detect intrusion into an EGM by monitoring security switches attached to access doors in the EGM cabinet. Access violations result in suspension of game play and can trigger additional security operations to preserve the current state of game play. These circuits also function when power is off by use of a battery backup. In power-off operation, these circuits continue to monitor the access doors of the EGM. When power is restored, the EGM can determine whether any security violations occurred while power was off, e.g., via software for reading status registers. This can trigger event log entries and further data authentication operations by the EGM software.

Trusted memory devices and/or trusted memory sources are included in an EGM to ensure the authenticity of the software that may be stored on less secure memory subsystems, such as mass storage devices. Trusted memory devices and controlling circuitry are typically designed to not enable modification of the code and data stored in the memory device while the memory device is installed in the EGM. The code and data stored in these devices may include authentication algorithms, random number generators, authentication keys, operating system kernels, etc. The purpose of these trusted memory devices is to provide gaming regulatory authorities a root trusted authority within the computing environment of the EGM that can be tracked and verified as original. This may be accomplished via removal of the trusted memory device from the EGM computer and verification of the secure memory device contents is a separate third party verification device. Once the trusted memory device is verified as authentic, and based on the approval of the verification algorithms included in the trusted device, the EGM is enabled to verify the authenticity of additional code and data that may be located in the gaming computer assembly, such as code and data stored on hard disk drives. Examples of trusted memory devices are described in U.S. Pat. No. 6,685,567, entitled "Process Verification," which is incorporated herein by reference.

In at least one embodiment, at least a portion of the trusted memory devices/sources may correspond to memory that cannot easily be altered (e.g., "unalterable memory") such as EPROMS, PROMS, Bios, Extended Bios, and/or other memory sources that are able to be configured, verified, and/or authenticated (e.g., for authenticity) in a secure and controlled manner.

According to one embodiment, when a trusted information source is in communication with a remote device via a network, the remote device may employ a verification scheme to verify the identity of the trusted information source. For example, the trusted information source and the remote device may exchange information using public and private encryption keys to verify each other's identities. In another embodiment, the remote device and the trusted information source may engage in methods using zero knowledge proofs to authenticate each of their respective identities.

EGMs storing trusted information may utilize apparatuses or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected. Examples of trusted memory devices/sources are described in U.S. Pat. No. 7,515,718, entitled "Secured Virtual Network in a Gaming Environment," which is incorporated herein by reference.

Mass storage devices used in a general purpose computing devices typically enable code and data to be read from and written to the mass storage device. In a gaming environment, modification of the gaming code stored on a mass storage device is strictly controlled and would only be enabled under specific maintenance type events with electronic and physical enablers required. Though this level of security could be provided by software, EGMs that include mass storage devices include hardware level mass storage data protection circuitry that operates at the circuit level to monitor attempts to modify data on the mass storage device and will generate both software and hardware error triggers should a data modification be attempted without the proper electronic and physical enablers being present. Examples of using a mass storage device are described in U.S. Pat. No. 6,149,522, entitled "Method of Authenticating Game Data Sets in an Electronic Casino Gaming System," which is incorporated herein by reference.

Various changes and modifications to the present embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A gaming system comprising:

a processor; and a memory device that stores instructions that, when executed by the processor, cause the processor to:

determine whether a modifier distribution event occurred for a first play of a game including a first outcome-generating element and a second outcome-generating element;

responsive to determining that the modifier distribution event did not occur for the first play of the game, maintain a plurality of persistent modifiers for a second play of the game;

responsive to determining that the modifier distribution event occurred for the first play of the game:

select one of the plurality of persistent modifiers;

determine a first individual modifier based on a first portion of the selected persistent modifier; and determine a second individual modifier based on a second portion of the selected persistent modifier;

randomly determine a first outcome for the first outcome-generating element and cause a display device to display the first outcome;

randomly determine a second outcome for the second outcome-generating element and cause the display device to display the second outcome;

determine any first awards based on the first outcome and, if the modifier distribution event occurred for the first play of the game, the first individual modifier; and determine any second awards based on the second outcome and, if the modifier distribution event occurred for the first play of the game, the second individual modifier.

2. The gaming system of claim 1, wherein the instructions, when executed by the processor, cause the processor to:

determine whether a modifier increase event occurred for the first play of the game; and responsive to determining that the modifier increase event occurred for the first play of the game, increase a value of one of the plurality of persistent modifiers.

3. The gaming system of claim 2, wherein the instructions, when executed by the processor, cause the processor to, responsive to determining that the modifier increase event occurred for the first play of the game, randomly select the one of the plurality of persistent modifiers.

4. The gaming system of claim 1, wherein the instructions, when executed by the processor, cause the processor to determine that the modifier distribution event occurred for the first play of the game responsive to determining to provide one of the plurality of persistent modifiers.

5. The gaming system of claim 4, wherein the instructions, when executed by the processor, cause the processor to, for the first play of the game:

(1) select a first one of the plurality of persistent modifiers;

(2) randomly determine whether to provide the first one of the plurality of persistent modifiers; and (3) responsive to randomly determining to provide the first one of the plurality of persistent modifiers, designate the first one of the plurality of persistent modifiers as the selected persistent modifier.

6. The gaming system of claim 5, wherein the instructions, when executed by the processor, cause the processor to, responsive to randomly determining not to provide the first one of the plurality of persistent modifiers, select a second one of the plurality of persistent modifiers and repeat (2) and (3) for the second one of the plurality of persistent modifiers.

7. The gaming system of claim 6, wherein the instructions, when executed by the processor, cause the processor to, responsive to randomly determining to provide the first one of the plurality of persistent modifiers, not repeat (2) and (3) for any of the other persistent modifiers for the first play of the game.

8. The gaming system of claim 5, wherein each of the plurality of persistent modifiers has one of a plurality of different values, and wherein the first one of the plurality of persistent modifiers has the highest value.

9. A gaming system comprising:

a processor; and a memory device that stores instructions that, when executed by the processor, cause the processor to:

determine whether a modifier distribution event occurred for a first play of a game;

responsive to determining that the modifier distribution event did not occur for the first play of the game, maintain a plurality of persistent modifiers for a second play of the game;

responsive to determining that the modifier distribution event occurred for the first play of the game:

select one of the plurality of persistent modifiers; and divide the selected persistent modifier into multiple individual modifiers based on respective portions of the selected persistent modifier; and for each of a plurality of outcome generators:

randomly determine an outcome and cause a display device to display the outcome; and determine any awards based on the outcome and, if the modifier distribution event occurred for the first play of the game, one of the individual modifiers.

10. The gaming system of claim 9, wherein the instructions, when executed by the processor, cause the processor to:

determine whether a modifier increase event occurred for the first play of the game; and responsive to determining that the modifier increase event occurred for the first play of the game, increase a value of one of the plurality of persistent modifiers.

11. The gaming system of claim 10, wherein the instructions, when executed by the processor, cause the processor to, responsive to determining that the modifier increase event occurred for the first play of the game, randomly select the one of the plurality of persistent modifiers.

12. The gaming system of claim 10, wherein the instructions, when executed by the processor, cause the processor to increase the value by a randomly selected amount.

13. A gaming system comprising:

a processor; and a memory device that stores instructions that, when executed by the processor, cause the processor to:

determine whether a multiplier distribution event occurred for a first play of a card game;

responsive to determining that the modifier distribution event occurred for the first play of the game:

select one of the plurality of persistent modifiers;

determine a first individual modifier based on a first portion of the selected persistent modifier; and determine a second individual modifier based on a second portion of the selected persistent modifier;

randomly determine and cause a display device to display an initial primary hand of cards;

finalize the primary hand of cards and create a second hand of cards responsive to receipt, by an input device, of a player input;

cause the display device to display the finalized first hand of cards and the second hand of cards;

determine any first awards based on the finalized first hand of cards and, if the modifier distribution event occurred for the first play of the game, the first individual modifier; and determine any second awards based on the second hand of cards and, if the modifier distribution event occurred for the first play of the game, the second individual modifier.

14. The gaming system of claim 13, wherein the instructions, when executed by the processor, cause the processor to, responsive to determining that the multiplier distribution event did not occur for the first play of the card game, maintain the plurality of persistent multipliers for a second play of the card game.

15. The gaming system of claim 13, wherein the instructions, when executed by the processor, cause the processor to:

determine whether a multiplier increase event occurred for the first play of the card game; and responsive to determining that the multiplier increase event occurred for the first play of the card game, increase a value of one of the plurality of persistent multipliers.

16. The gaming system of claim 15, wherein the instructions, when executed by the processor, cause the processor to, responsive to determining that the multiplier increase event occurred in association with the first play of the game, randomly select the one of the plurality of persistent modifiers.

17. The gaming system of claim 16, wherein the instructions, when executed by the processor, cause the processor to increase the value of the randomly selected one of the plurality of persistent modifiers by a randomly selected amount.

* * * * *